United States Patent
Hibi et al.

(10) Patent No.: US 10,274,314 B2
(45) Date of Patent: Apr. 30, 2019

(54) SHAPE INSPECTION METHOD, SHAPE INSPECTION APPARATUS, AND PROGRAM

(71) Applicant: NIPPON STEEL & SUMITOMO METAL CORPORATION, Tokyo (JP)

(72) Inventors: Atsuhiro Hibi, Tokyo (JP); Yusuke Konno, Tokyo (JP); Nobuhiro Furuya, Tokyo (JP); Tomohiro Kuroiwa, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/571,609

(22) PCT Filed: May 13, 2016

(86) PCT No.: PCT/JP2016/064266
§ 371 (c)(1),
(2) Date: Nov. 3, 2017

(87) PCT Pub. No.: WO2016/182055
PCT Pub. Date: Nov. 17, 2016

(65) Prior Publication Data
US 2018/0143009 A1    May 24, 2018

(30) Foreign Application Priority Data
May 13, 2015   (JP) .................. 2015-098031

(51) Int. Cl.
G01B 11/24   (2006.01)
G01B 11/25   (2006.01)
G01B 11/30   (2006.01)
G06T 7/00    (2017.01)

(52) U.S. Cl.
CPC .......... G01B 11/2518 (2013.01); G01B 11/24 (2013.01); G01B 11/306 (2013.01); G06T 7/0002 (2013.01)

(58) Field of Classification Search
CPC .............. G01B 11/002; G01B 11/2545; G01B 11/2518; G01B 11/306; G06T 7/70; G06T 7/0002
(Continued)

(56) References Cited

U.S. PATENT DOCUMENTS 4,961,155 A   10/1990 Ozeki et al.
5,671,056 A   9/1997 Sato
(Continued)

FOREIGN PATENT DOCUMENTS

JP   64-78109 A    3/1989
JP   8-327338 A    12/1996
(Continued)

OTHER PUBLICATIONS

English translation of the Written Opinion of the International Searching Authority (Form PCT/ISA/237) for Application No. PCT/JP2016/064266, dated Aug. 2, 2016.
(Continued)

Primary Examiner — Hoa Q Pham
(74) Attorney, Agent, or Firm — Birch, Stewart, Kolasch & Birch, LLP

(57) ABSTRACT

[Object] To provide a shape inspection method, a shape inspection apparatus, and a program capable of adjusting the brightness and the thickness of a light-section line in a light-section image more simply and objectively.

[Solution] A shape inspection method according to the present invention includes: a light-section image generation step in which linear laser light is applied to an object surface from a laser light source and a light-section line based on the laser light on the object surface is imaged by an imaging apparatus, and thereby a light-section image that is a captured image used for a light-section method is generated; an indicator value calculation step in which a thickness indi-
(Continued)

cator value indicating a thickness of the light-section line and a brightness indicator value indicating a brightness of the light-section line in the light-section image are calculated; a setting changing step in which setting of at least one of the laser light source and the imaging apparatus is changed so that each of the calculated thickness indicator value and the calculated brightness indicator value is within a prescribed range uniquely set in advance; and a shape inspection step in which image processing is performed on the light-section image after each of the thickness indicator value and the brightness indicator value is brought within the prescribed range, and thereby a shape of the object surface is inspected.

9 Claims, 12 Drawing Sheets

(58) Field of Classification Search
USPC .................................. 356/601–623; 702/152
See application file for complete search history.

(56) References Cited

U.S. PATENT DOCUMENTS

| | | | | |
|---|---|---|---|---|
| 7,207,251 | B2* | 4/2007 | Ushiwata | B23D 59/003 83/468.3 |
| 7,321,394 | B1* | 1/2008 | Grodevant | G02B 21/008 348/255 |
| 2008/0024793 | A1* | 1/2008 | Gladnick | G01B 11/007 356/603 |

FOREIGN PATENT DOCUMENTS

| | | |
|---|---|---|
| JP | 11-125508 A | 5/1999 |
| JP | 3243385 B2 | 1/2002 |
| JP | 2013-213733 A | 10/2013 |
| JP | 5488953 B2 | 5/2014 |

OTHER PUBLICATIONS

International Search Report for PCT/JP2016/064266 dated Aug. 2, 2016.
Written Opinion of the International Searching Authority for PCT/JP2016/064266 (PCT/ISA/237) dated Aug. 2, 2016.
Japanese Office Action, dated Jun. 26, 2018, for corresponding Japanese Application No. 2017-518003 with partial English Translation.
Korean Office Action, dated Jul. 19, 2018, for corresponding Korean Application No. 10-2017-7031715, with partial English translation.
Extended European Search Report issued in corresponding European Application No. 16792779.7 and dated Jul. 23, 2018.

* cited by examiner

EXTENDING DIRECTION OF
LIGHT-SECTION LINE

LUMINANCE IMAGE
IN WHICH NOISE IS SUPERIMPOSED

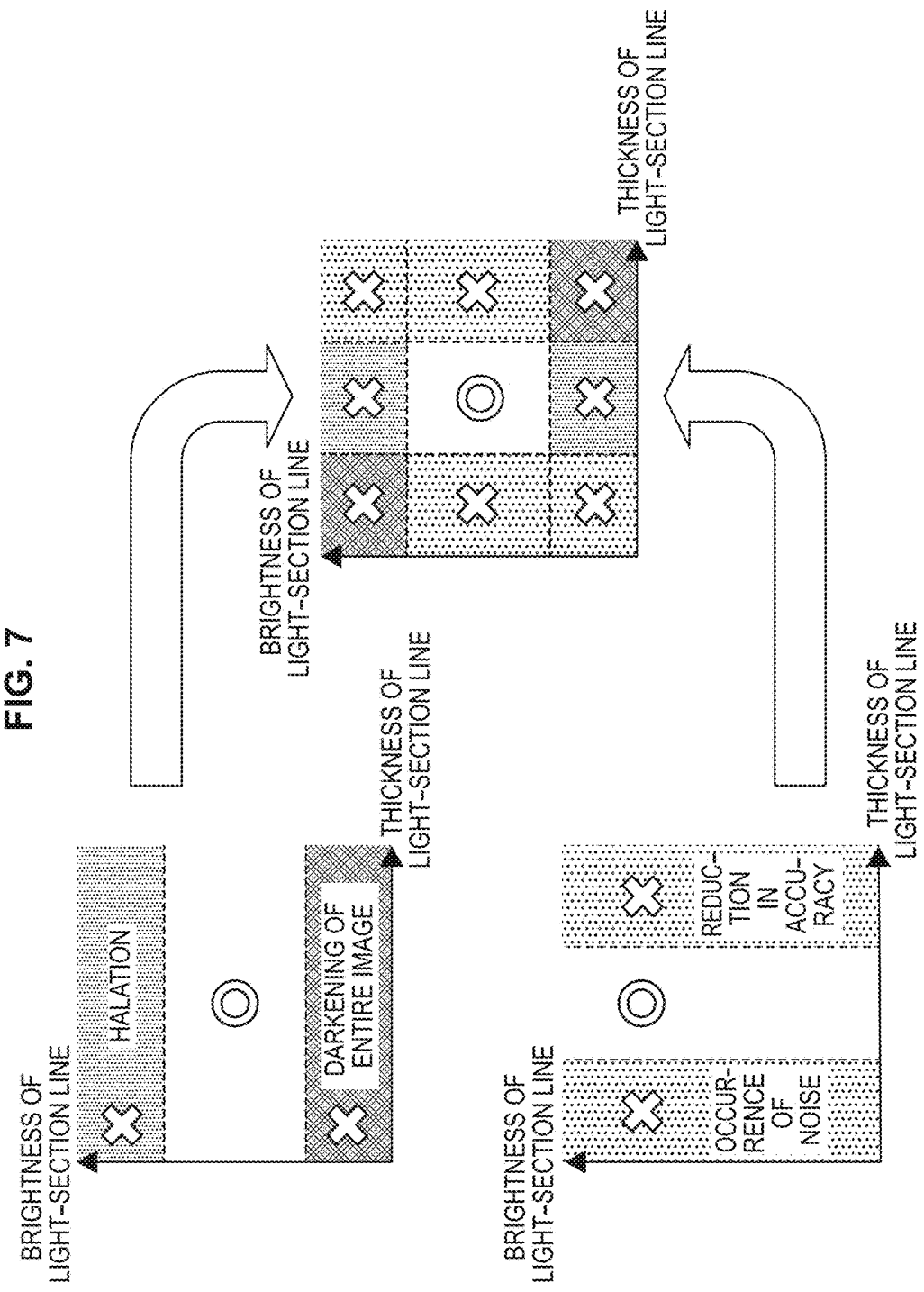

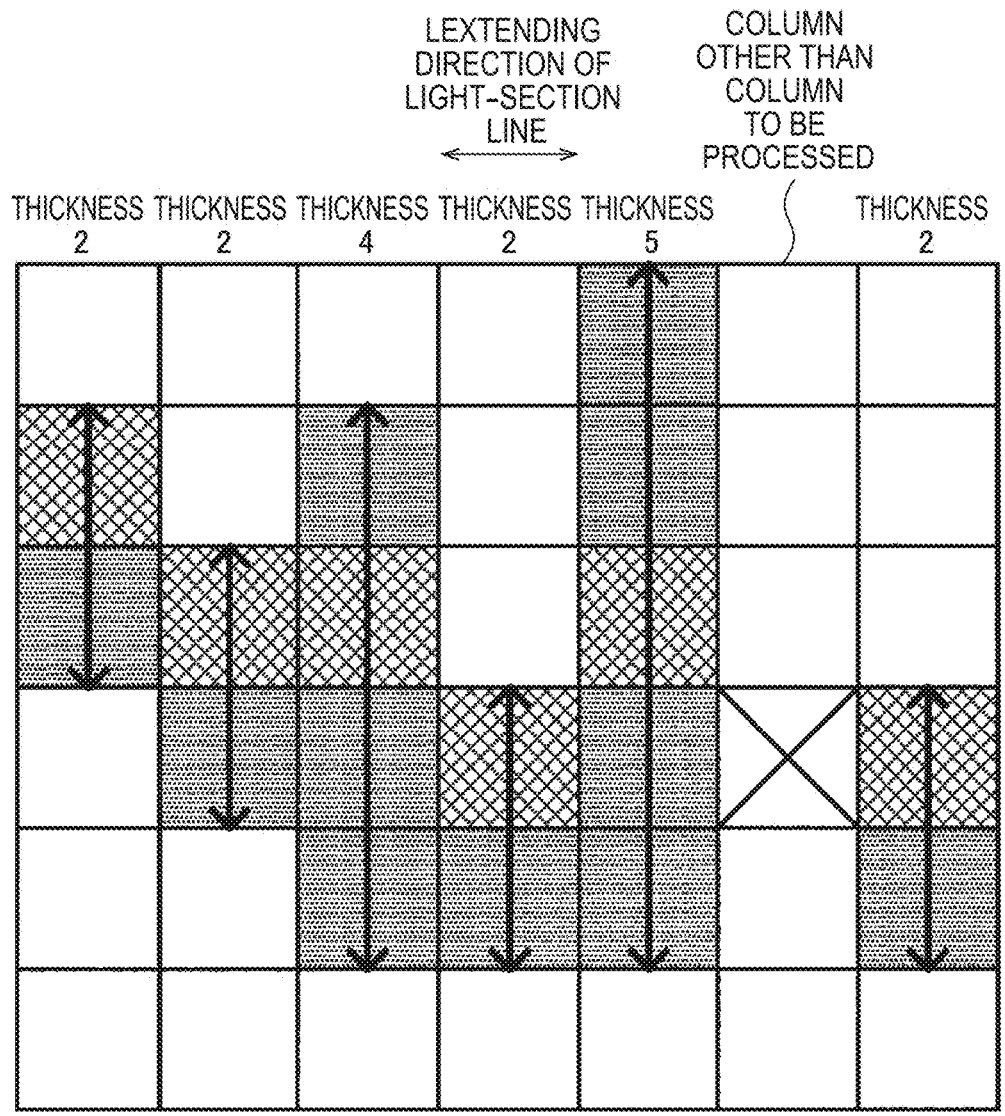

FIG. 11

| | APPROPRIATE | | | TOO THICK | | | TOO THIN | | | TOO DARK | | | TOO BRIGHT | | |
|---|---|---|---|---|---|---|---|---|---|---|---|---|---|---|---|
| | THICK-NESS INDICATOR VALUE | BRIGHT-NESS INDICATOR VALUE | DEPTH SCATTE-RING | THICK-NESS INDICATOR VALUE | BRIGHT-NESS INDICATOR VALUE | DEPTH SCATTE-RING | THICK-NESS INDICATOR VALUE | BRIGHT-NESS INDICATOR VALUE | DEPTH SCATTE-RING | THICK-NESS INDICATOR VALUE | BRIGHT-NESS INDICATOR VALUE | DEPTH SCATTE-RING | THICK-NESS INDICATOR VALUE | BRIGHT-NESS INDICATOR VALUE | DEPTH SCATTE-RING |
| 1 | 1.27 | 0.27 | 4.36 | 3.17 | 0.45 | 12.94 | 1.11 | 0.28 | 4.25 | 1.34 | 0.17 | 4.34 | 1.28 | 0.63 | 3.69 |
| 2 | 1.34 | 0.28 | 4.27 | 2.82 | 0.44 | 14.68 | 1.17 | 0.27 | 4.49 | 1.54 | 0.16 | 4.60 | 1.49 | 0.72 | 3.31 |
| 3 | 1.50 | 0.28 | 4.82 | 3.26 | 0.39 | 18.61 | 1.12 | 0.45 | 3.95 | 1.51 | 0.17 | 5.87 | 1.66 | 0.79 | 3.47 |
| 4 | 2.02 | 0.26 | 7.37 | 4.07 | 0.33 | 26.66 | 1.18 | 0.49 | 3.61 | 1.65 | 0.14 | 6.32 | 1.75 | 0.81 | 3.73 |
| 5 | 2.34 | 0.24 | 9.79 | 2.80 | 0.22 | 15.71 | 1.18 | 0.49 | 3.91 | 2.01 | 0.16 | 6.72 | 1.85 | 0.87 | 4.64 |
| 6 | 1.33 | 0.50 | 3.67 | | | | | | | 2.30 | 0.16 | 8.30 | 2.44 | 0.90 | 5.15 |
| 7 | 1.37 | 0.52 | 3.85 | | | | | | | 2.85 | 0.14 | 14.40 | | | |
| 8 | 1.53 | 0.24 | 4.12 | | | | | | | | | | | | |
| 9 | 2.16 | 0.52 | 6.06 | | | | | | | | | | | | |
| 10 | 2.52 | 0.49 | 7.84 | | | | | | | | | | | | |
| 11 | 1.38 | 0.51 | 4.65 | | | | | | | | | | | | |
| 12 | 1.65 | 0.51 | 5.91 | | | | | | | | | | | | |
| 13 | 1.71 | 0.51 | 6.31 | | | | | | | | | | | | |
| 14 | 1.97 | 0.49 | 7.85 | | | | | | | | | | | | |

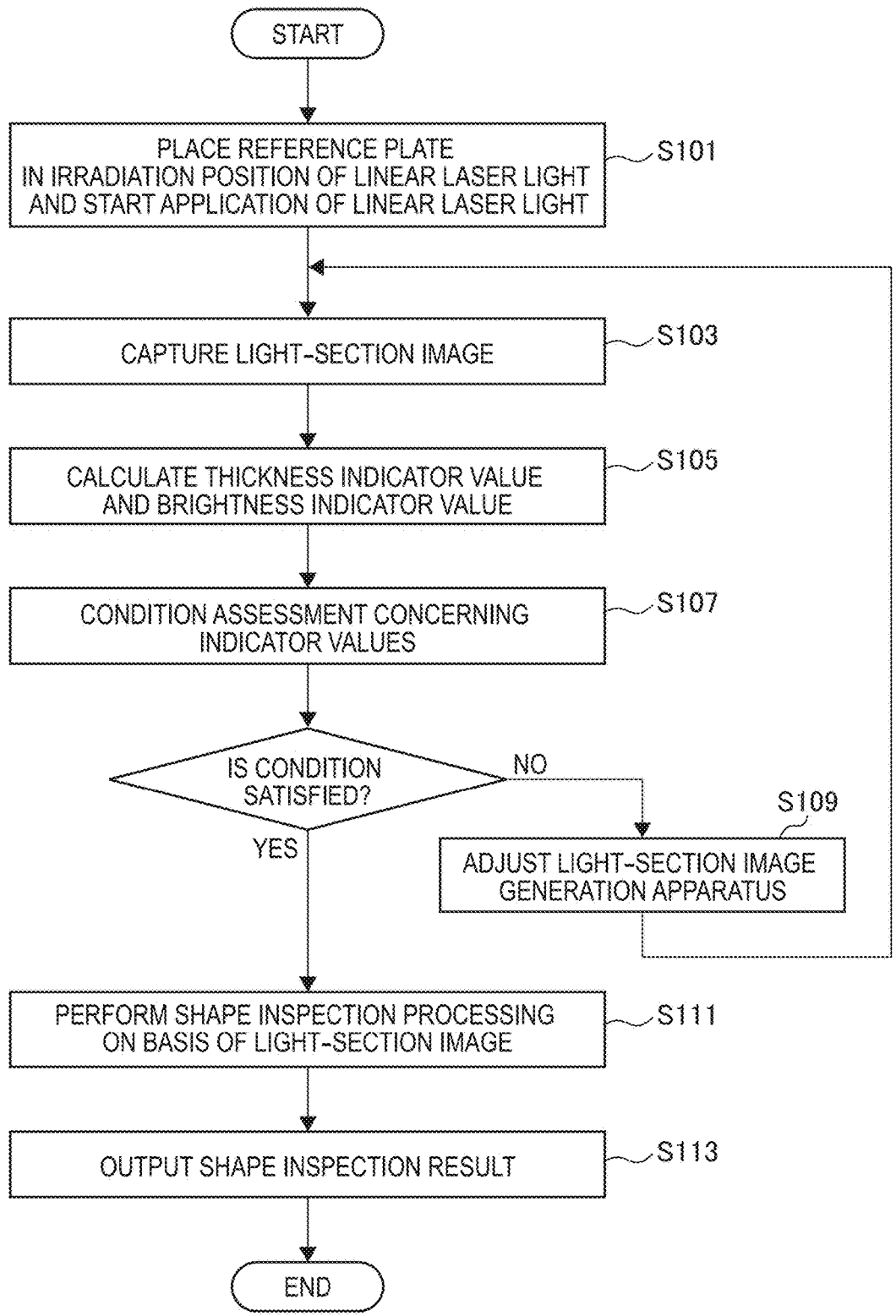

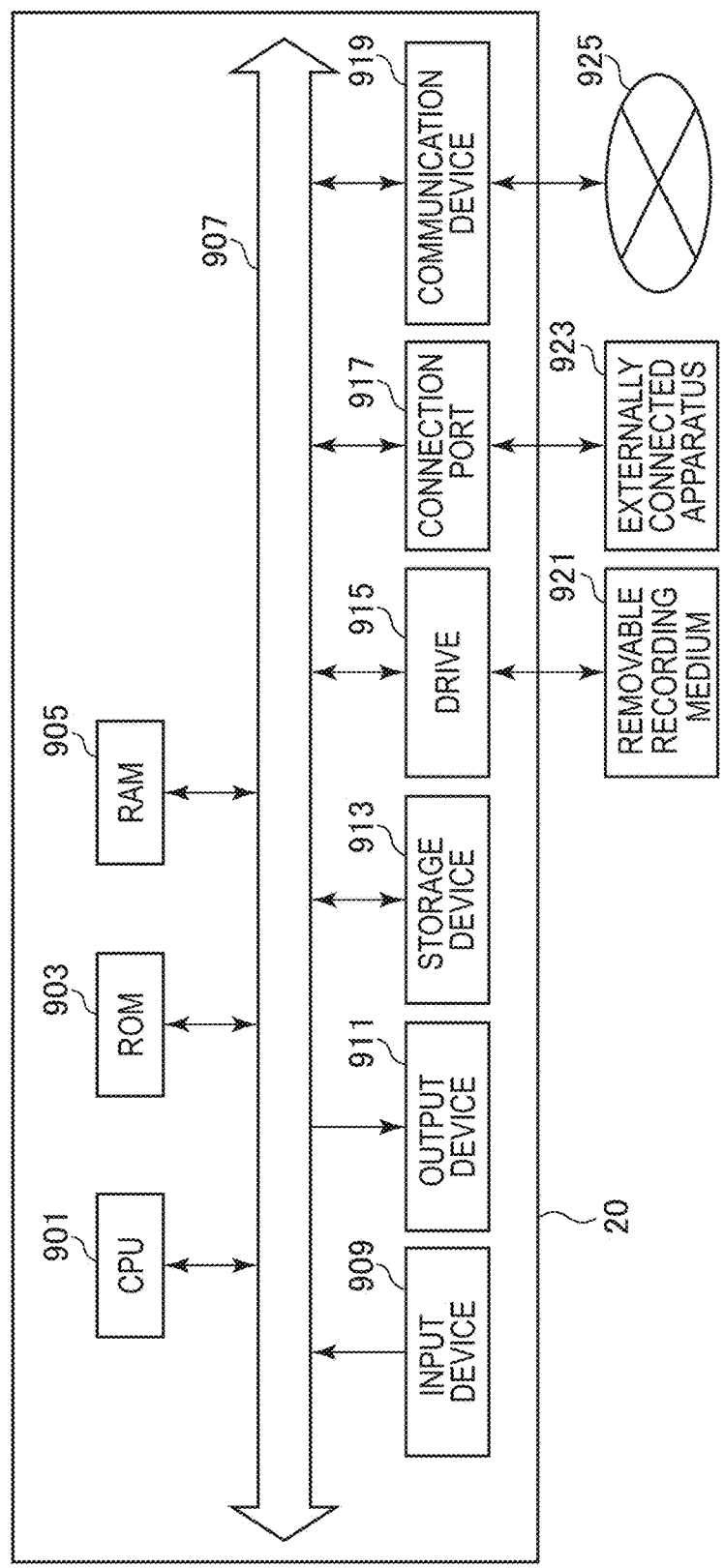

SHAPE INSPECTION METHOD, SHAPE INSPECTION APPARATUS, AND PROGRAM

TECHNICAL FIELD

The present invention relates to a shape inspection method, a shape inspection apparatus, and a program.

BACKGROUND ART

Thus far, there has been known a method in which linear light being applied to a surface of an object to be measured is imaged and the surface shape of the object to be measured is measured on the basis of what is called a light-section method; for example, Patent Literature 1 below proposes a method in which linear laser light applied along the width direction of an object to be measured such as a slab, which is a steel semi-finished product in the course of conveyance, is successively imaged by an area camera, a luminance image and an unevenness image are generated from the obtained captured image, and then the surface of the object to be measured is inspected on the basis of the luminance image and the unevenness image. In this method, the principle of the light-section method is applied to the plurality of successively captured images (light-section images) to generate an unevenness image, and a defect having an unevenness change of the surface, such as a vertical crack having an opening, is detected on the basis of the unevenness image. Further, in this method, a luminance image is generated from information on the brightness (that is, luminance) of the light-section line, and is used to detect a defect having a reflectance change that does not have an opening, such as a transverse crack.

CITATION LIST

Patent Literature

Patent Literature 1: JP 5488953B
Patent Literature 2: JP 3243385B

SUMMARY OF INVENTION

Technical Problem

Here, in the case of using a technology like that disclosed in Patent Literature 1 above, it is important to obtain a light-section image serving as a basis of the luminance image and the unevenness image appropriately, and therefore it is important to set the thickness and the brightness of linear laser light to be applied to the object to be measured to an appropriate state beforehand. On the other hand, to generate a light-section image using the light-section method, it is necessary to relatively move the object to be measured and the optical system for imaging the object to be measured. Hence, when adjusting the thickness and the brightness of the light-section line based on linear laser light on the object surface beforehand, the thickness and the brightness of the light-section line have been adjusted by trial and error while relative movement and the generation of light-section images like those mentioned above are repeated. However, such operation imposes a very high burden and requires some operating time in a production line or the like in the steel industry, for example; thus, this has not been practical.

Furthermore, objective indicators that can define the thickness and the brightness of the light-section line simultaneously do not exist; hence, when adjusting the thickness and the brightness of the light-section line, the adjustment operation of the optical system has been performed in dependence only on the subjective view of the adjuster.

Patent Literature 2 above describes a calibration method in which, to adjust the intensity of LED illumination, the sum total of luminance values obtained from images in which an illuminated calibration plate is imaged is compared with a reference value. However, in the light-section method, the light-section image is influenced by not only the brightness but also the thickness of the light-section line; hence, calibration using an indicator of only brightness is not sufficient. Furthermore, Patent Literature 2 above has no mention on the method to determine the reference value.

As seen from above, the current situation is that a method capable of adjusting the brightness and the thickness of a light-section line in a light-section image more simply and objectively is desired.

Thus, the present invention has been made in view of the problem mentioned above, and an object of the present invention is to provide a shape inspection method, a shape inspection apparatus, and a program that can adjust the brightness and the thickness of a light-section line in a light-section image more simply and objectively.

Solution to Problem

According to an aspect of the present invention in order to achieve the above-mentioned object, there is provided a shape inspection method including: a light-section image generation step in which linear laser light is applied to an object surface from a laser light source and a light-section line based on the laser light on the object surface is imaged by an imaging apparatus, and thereby a light-section image that is a captured image used for a light-section method is generated; an indicator value calculation step in which a thickness indicator value indicating a thickness of the light-section line and a brightness indicator value indicating a brightness of the light-section line in the light-section image are calculated; a setting changing step in which setting of at least one of the laser light source and the imaging apparatus is changed so that each of the calculated thickness indicator value and the calculated brightness indicator value is within a prescribed range uniquely set in advance; and a shape inspection step in which image processing is performed on the light-section image after each of the thickness indicator value and the brightness indicator value is brought within the prescribed range, and thereby a shape of the object surface is inspected.

In the indicator value calculation step, the thickness indicator value and the brightness indicator value may be calculated using the light-section image obtained by imaging of only one light-section line on the object at rest.

It is preferable that in the indicator value calculation step, a pixel giving a maximum luminance value be specified in each of column directions of a light-section image related to the object surface that are directions corresponding to a relative movement direction of the object and the laser light source, and in a case where the maximum luminance value in a column has a luminance value not less than a first threshold, that column be taken as a pixel column to be processed, that the sum of the number of pixels giving the maximum luminance value and the number of pixels having a luminance value not less than a second threshold with respect to the maximum luminance value in each of the pixel columns to be processed be taken as the thickness of the light-section line in each of the pixel columns to be processed, and the average of the thicknesses of the light-section line in all the pixel columns to be processed be calculated and taken as the thickness indicator value, and that a value obtained by dividing the average of luminance values in all pixels that have been used at a time of calculating the thickness indicator value by a maximum output luminance value possibly outputted from the imaging apparatus be taken as the brightness indicator value.

It is preferable that in the setting changing step, setting of at least one of the laser light source and the imaging apparatus be changed so that the thickness indicator value is within a range of 1.27 to 2.52 and the brightness indicator value is within a range of 0.24 to 0.52.

It is preferable that in the setting changing step, at least one of a focus of a lens included in the imaging apparatus, a focus of a lens included in the laser light source, and a separation distance between the laser light source and the object surface be adjusted in order to bring the thickness indicator value within the prescribed range, and that at least one of an exposure time of the imaging apparatus, an aperture of a lens included in the imaging apparatus, a gain of the imaging apparatus, and a power of the laser light source be adjusted in order to bring the brightness indicator value within the prescribed range.

According to an aspect of the present invention in order to achieve the above-mentioned object, there is provided a shape inspection apparatus including: a light-section image generation apparatus that includes a laser light source that applies linear laser light to an object surface, and an imaging apparatus that images a light-section line based on the laser light on the object surface and generates a light-section image that is a captured image used for a light-section method; and an arithmetic processing apparatus that performs image processing on the light-section image generated by the light-section image generation apparatus, assesses a state of the light-section line, and performs a shape inspection of the object surface based on a light-section method on the basis of the light-section image. The arithmetic processing apparatus includes an indicator value calculation unit that, on the basis of the light-section image generated by the imaging apparatus, calculates a thickness indicator value indicating a thickness of the light-section line and a brightness indicator value indicating a brightness of the light-section line in the light-section image, an assessment unit that, on the basis of the calculated thickness indicator value and the calculated brightness indicator value, assesses whether each of the thickness indicator value and the brightness indicator value is within a prescribed range or not, and a shape inspection unit that performs shape inspection processing based on a light-section method on the basis of the light-section image after each of the thickness indicator value and the brightness indicator value is brought within a prescribed range uniquely set in advance.

The indicator value calculation unit may calculate the thickness indicator value and the brightness indicator value using the light-section image obtained by imaging of only one light-section line on the object at rest.

It is preferable that the indicator value calculation unit specify a pixel giving a maximum luminance value in each of column directions of a light-section image related to the object surface that are directions corresponding to a relative movement direction of the object and the laser light source, and in a case where the maximum luminance value in a column has a luminance value not less than a first threshold, takes that column as a pixel column to be processed, take the sum of the number of pixels giving the maximum luminance value and the number of pixels having a luminance value not less than a second threshold with respect to the maximum luminance value in each of the pixel columns to be processed as the thickness of the light-section line in each of the pixel columns to be processed, and calculate the average of the thicknesses of the light-section line in all the pixel columns to be processed and take the average as the thickness indicator value, and take a value obtained by dividing the average of luminance values in all pixels that have been used at a time of calculating the thickness indicator value by a maximum output luminance value possibly outputted from the imaging apparatus as the brightness indicator value.

The shape inspection apparatus may further include an adjustment mechanism that adjusts setting of at least one of the laser light source and the imaging apparatus included in the light-section image generation apparatus, the arithmetic processing apparatus may further include an imaging control unit that controls driving of the light-section image generation apparatus, and an adjustment control unit that controls driving of the adjustment mechanism, and the adjustment control unit, on the basis of assessment result by the assessment unit, puts at least one of the adjustment mechanism and the imaging control unit into operation so that the thickness indicator value and the brightness indicator value are within the prescribed range.

It is preferable that in the shape inspection apparatus, setting of at least one of the laser light source and the imaging apparatus be changed so that the thickness indicator value is within a range of 1.27 to 2.52 and the brightness indicator value is within a range of 0.24 to 0.52.

It is preferable that in the shape inspection apparatus, at least one of a focus of a lens included in the imaging apparatus, a focus of a lens included in the laser light source, and a separation distance between the laser light source and the object surface be adjusted in order to bring the thickness indicator value within the prescribed range, and that at least one of an exposure time of the imaging apparatus, an aperture of a lens included in the imaging apparatus, a gain of the imaging apparatus, and a power of the laser light source be adjusted in order to bring the brightness indicator value within the prescribed range.

According to an aspect of the present invention in order to achieve the above-mentioned object, there is provided a program for causing a computer capable of mutually communicating with a light-section image generation apparatus including a laser light source that applies linear laser light to an object surface, and an imaging apparatus that images a light-section line based on the laser light on the object surface and generates a light-section image that is a captured image used for a light-section method to function as an arithmetic processing apparatus that performs image processing on the light-section image generated by the light-section image generation apparatus, assesses a state of the light-section line, and performs a shape inspection of the object surface based on a light-section method on the basis of the light-section image. The program is for causing the computer to execute: an indicator value calculation function of, on the basis of the light-section image generated by the imaging apparatus, calculating a thickness indicator value indicating a thickness of the light-section line and a brightness indicator value indicating a brightness of the light-section line in the light-section image; an assessment function of, on the basis of the calculated thickness indicator value and the calculated brightness indicator value, assessing whether each of the thickness indicator value and the brightness indicator value is within a prescribed range or not; and a shape inspection function of performing shape inspection processing based on a light-section method on the basis of the light-section image after each of the thickness indicator value and the brightness indicator value is brought within a prescribed range uniquely set in advance.

The indicator value calculation function may calculate the thickness indicator value and the brightness indicator value using the light-section image obtained by imaging of only one light-section line on the object at rest.

It is preferable that the indicator value calculation function specify a pixel giving a maximum luminance value in each of column directions of a light-section image related to the object surface that are directions corresponding to a relative movement direction of the object and the laser light source, and in a case where the maximum luminance value in a column has a luminance value not less than a first threshold, take that column as a pixel column to be processed, take the sum of the number of pixels giving the maximum luminance value and the number of pixels having a luminance value not less than a second threshold with respect to the maximum luminance value in each of the pixel columns to be processed as the thickness of the light-section line in each of the pixel columns to be processed, and calculate the average of the thicknesses of the light-section line in all the pixel columns to be processed and take the average as the thickness indicator value, and take a value obtained by dividing the average of luminance values in all pixels that have been used at a time of calculating the thickness indicator value by a maximum output luminance value possibly outputted from the imaging apparatus as the brightness indicator value.

The computer may be further capable of mutually communicating with an adjustment mechanism that adjusts setting of at least one of the laser light source and the imaging apparatus included in the light-section image generation apparatus, the program may further cause the computer to execute: an imaging control function of controlling driving of the light-section image generation apparatus; and an adjustment control function of controlling driving of the adjustment mechanism, and the adjustment control function, on the basis of assessment result by the assessment function, may put at least one of the adjustment mechanism and the imaging control function into operation so that the thickness indicator value and the brightness indicator value are within a prescribed range.

The adjustment control function may cause at least one of the adjustment mechanism and the imaging control function to change setting of at least one of the laser light source and the imaging apparatus so that the thickness indicator value is within a range of 1.27 to 2.52 and the brightness indicator value is within a range of 0.24 to 0.52.

It is preferable that the adjustment control function cause at least one of the adjustment mechanism and the imaging control function to adjust at least one of a focus of a lens included in the imaging apparatus, a focus of a lens included in the laser light source, and a separation distance between the laser light source and the object surface in order to bring the thickness indicator value within the prescribed range, and cause at least one of the adjustment mechanism and the imaging control function to adjust at least one of an exposure time of the imaging apparatus, an aperture of a lens included in the imaging apparatus, a gain of the imaging apparatus, and a power of the laser light source in order to bring the brightness indicator value within the prescribed range.

Further, to solve the issue mentioned above, according to yet another aspect of the present invention, a recording medium on which the program is recorded is provided.

Advantageous Effects of Invention

As described above, according to the present invention, by using a brightness indicator value and a thickness indicator value like those mentioned above, it becomes possible to adjust the brightness and the thickness of a light-section line in a light-section image more simply and objectively.

BRIEF DESCRIPTION OF DRAWINGS

FIG. 7 is an explanatory diagram for describing the brightness and the thickness of a light-section line.

FIG. 9 is an explanatory diagram for describing indicator value calculation processing according to the embodiment.

FIG. 11 is an explanatory diagram for describing the brightness indicator value and the thickness indicator value according to the embodiment.

FIG. 12 is a flowchart showing an example of a sequence of a shape inspection method according to the embodiment.

FIG. 13 is a block diagram schematically illustrating an example of a hardware configuration of an arithmetic processing apparatus according to an embodiment of the present invention.

DESCRIPTION OF EMBODIMENTS

Hereinafter, (a) preferred embodiment(s) of the present invention will be described in detail with reference to the appended drawings. In this specification and the drawings, elements that have substantially the same function and structure are denoted with the same reference signs, and repeated explanation is omitted.

(With Regard to Shape Inspection Apparatus Using Light-Section Method)

First, an overview of a shape inspection apparatus using the light-section method is briefly described with reference to FIG. 1 to FIG. 6.

Figure 1:
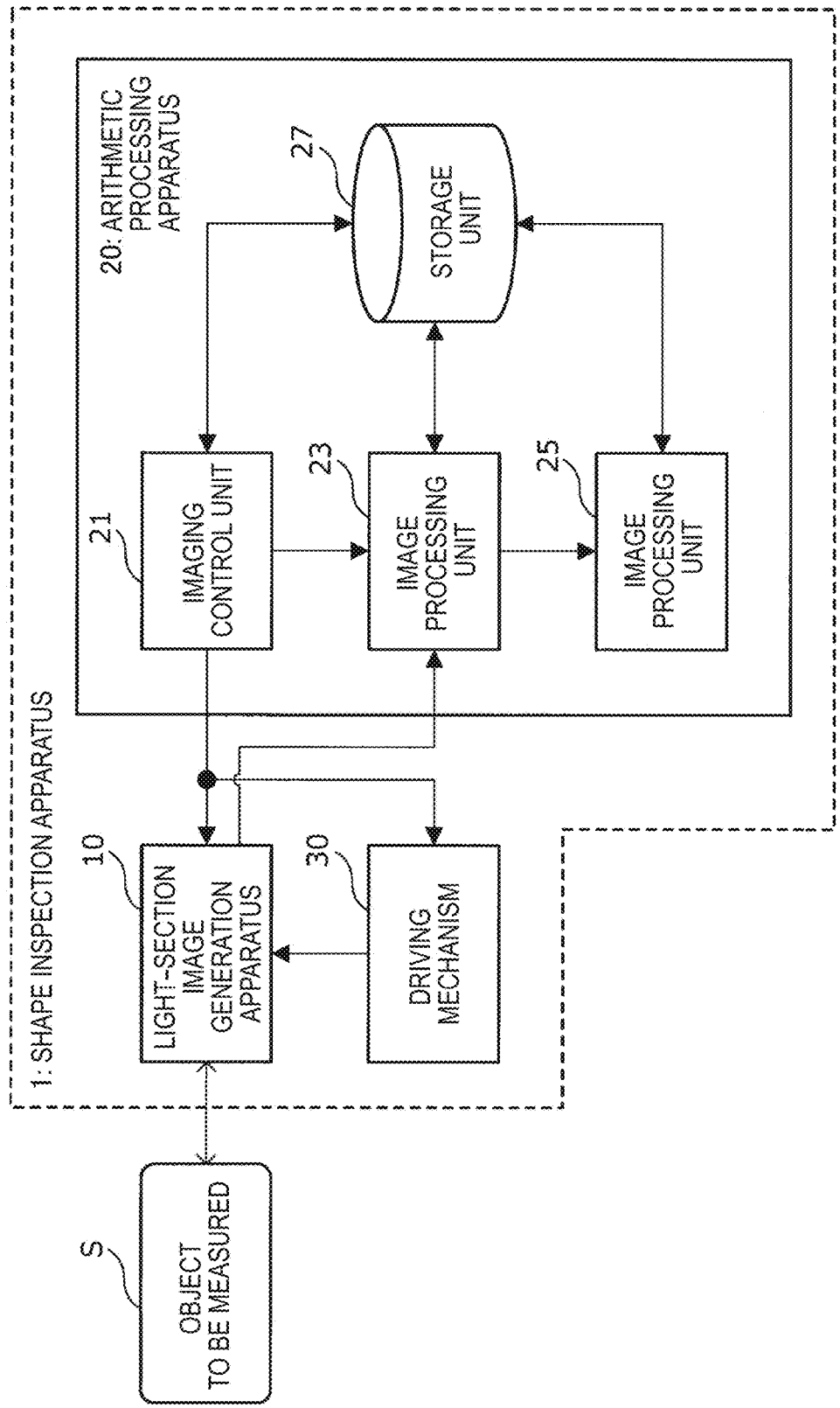
FIG. 1 is a block diagram schematically showing an example of the configuration of a shape inspection apparatus using the light-section method.
Figure 2:
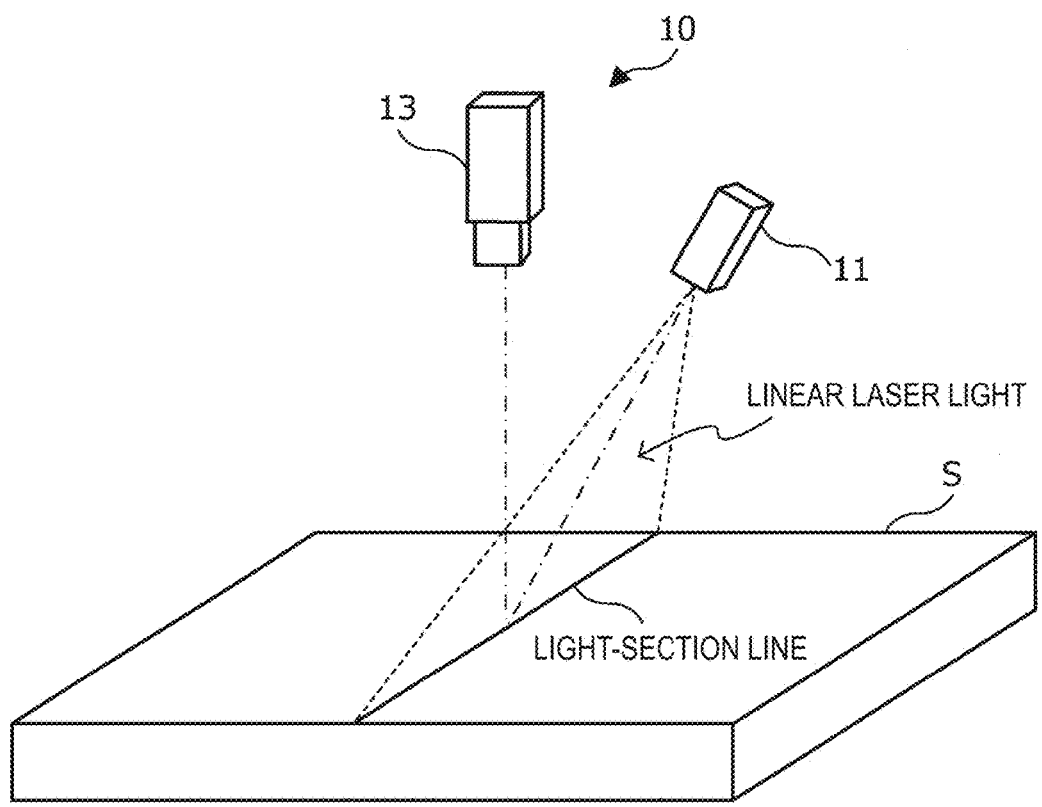
FIG. 2 is an explanatory diagram schematically showing the configuration of a light-section image generation apparatus provided in the shape inspection apparatus.
Figure 3:
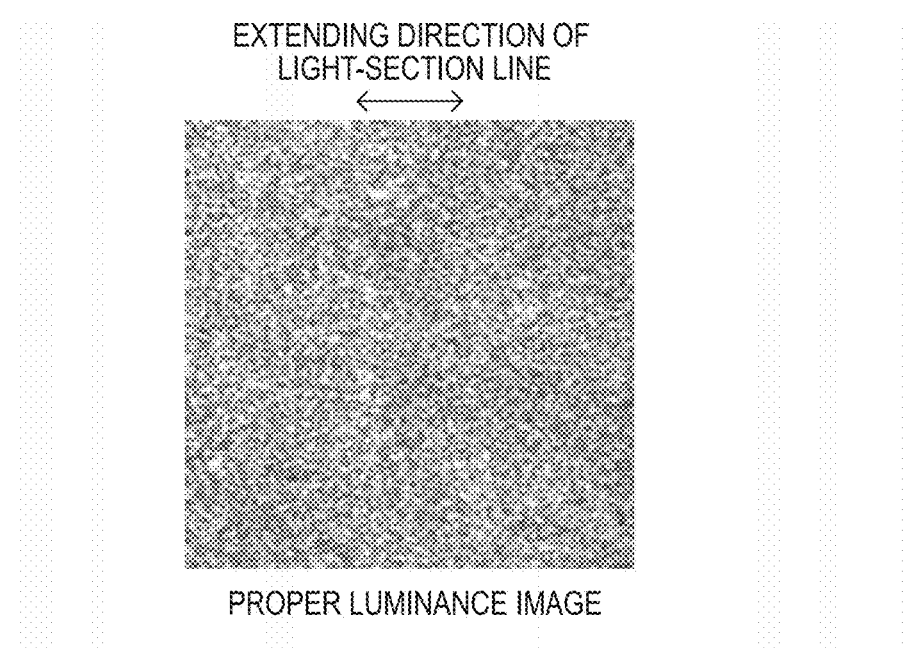
FIG. 3 is an explanatory diagram showing an example of the luminance image generated from an appropriately captured light-section image.
Figure 4:
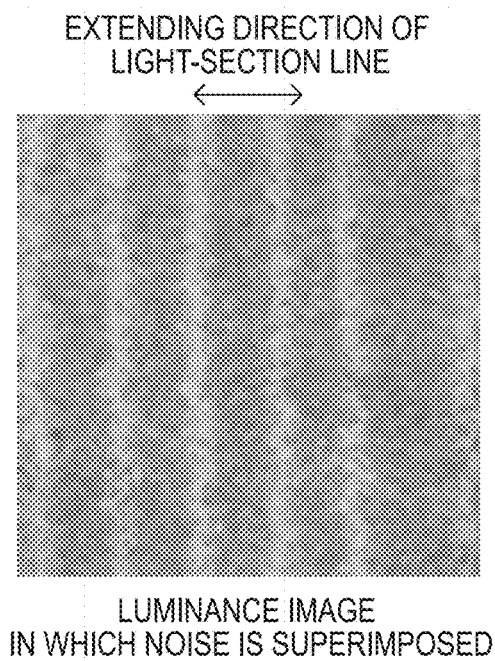
FIG. 4 is an explanatory diagram showing an example of the luminance image generated from a not appropriately captured light-section image.
Figure 5:
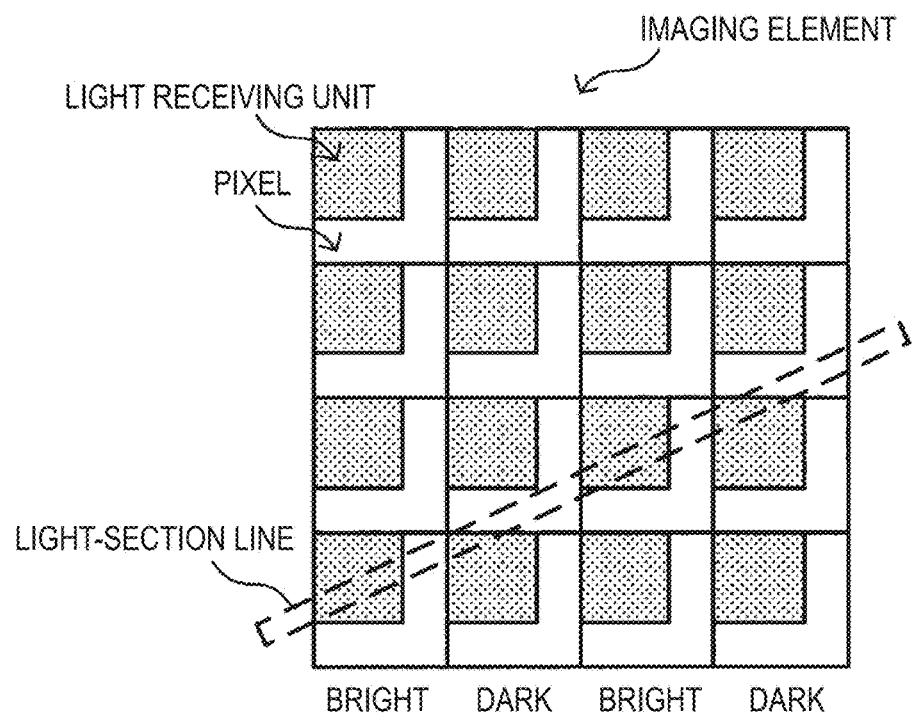
FIG. 5 is an explanatory diagram for describing a cause of noise superimposed in a luminance image.
Figure 6:
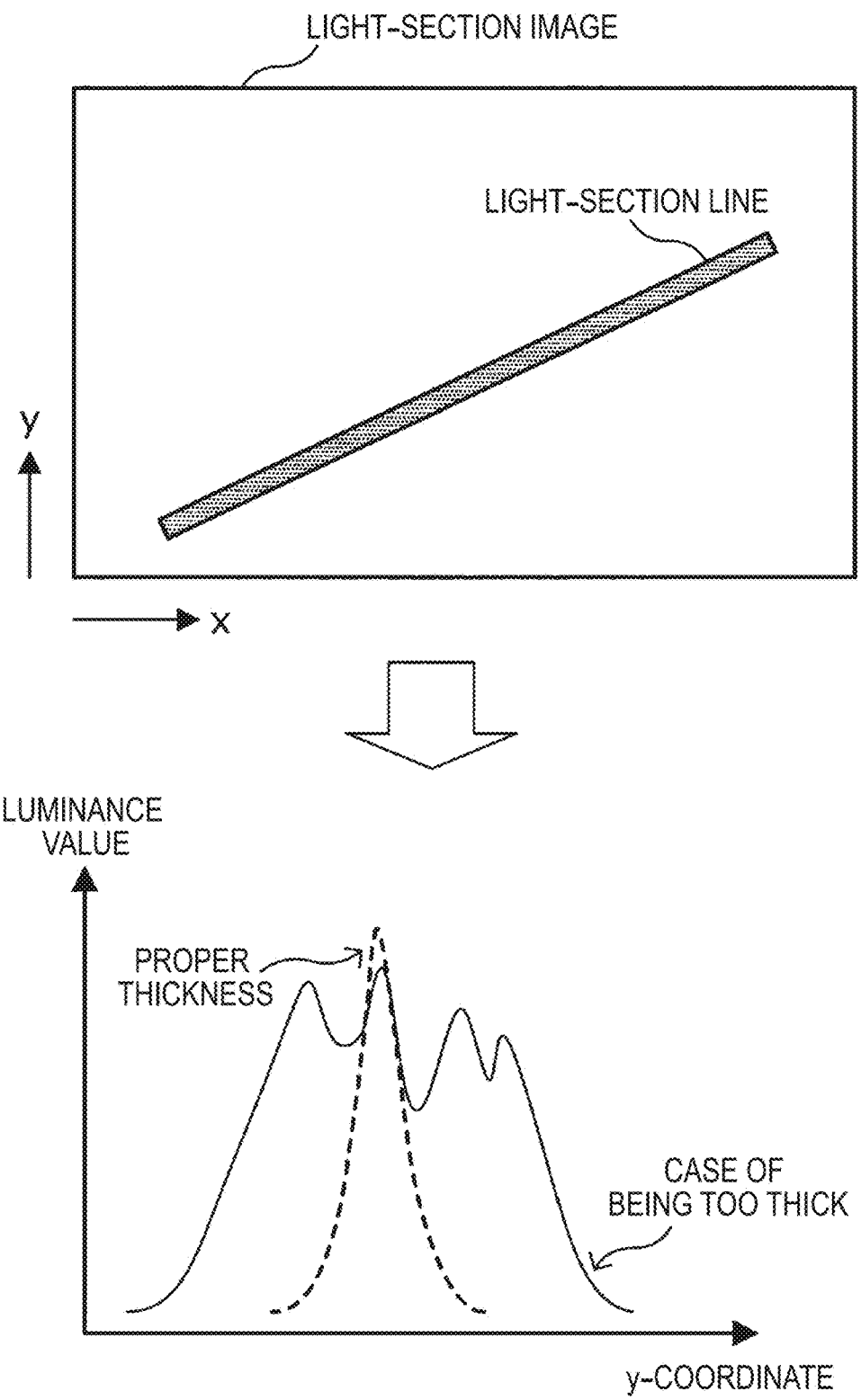
FIG. 6 is an explanatory diagram for describing the thickness of a light-section line.

FIG. 1 is a block diagram schematically showing an example of the configuration of a shape inspection apparatus using the light-section method, and FIG. 2 is an explanatory diagram schematically showing the configuration of a light-section image generation apparatus provided in the shape inspection apparatus. FIG. 3 is an explanatory diagram showing an example of the luminance image generated from an appropriately captured light-section image, and FIG. 4 is an explanatory diagram showing an example of the luminance image generated from a not appropriately captured light-section image. FIG. 5 is an explanatory diagram for describing a cause of noise superimposed in a luminance image. FIG. 6 is an explanatory diagram for describing the thickness of a light-section line.

As schematically shown in FIG. 1, a shape inspection apparatus 1 that measures the surface shape of an object to be measured S using the light-section method is usually composed of a light-section image generation apparatus 10, an arithmetic processing apparatus 20, and a driving mechanism 30.

Here, the light-section image generation apparatus 10 is an apparatus that applies linear laser light to the object to be measured S and images a light-section line based on the linear laser light on the surface of the object to be measured S, and thereby generates a light-section image related to the object to be measured S. The light-section image generation apparatus 10 is composed of, as schematically shown in FIG. 2, a laser light source 11 that applies linear laser light to the object to be measured S and an imaging apparatus 13 that images a light-section line on the surface of the object to be measured S.

The laser light source 11 is composed of, for example, a light source unit that emits laser light of a prescribed wavelength, such as in the visible light range, and a lens (e.g., a cylindrical lens, a rod lens, a Powell lens, or the like) for condensing laser light emitted from the light source unit in the line width direction while spreading the laser light in the length direction and thus generating linear light. The thickness of the light-section line at the laser irradiation position can be adjusted by changing the focus in the line width direction of the lens.

The imaging apparatus 13 includes, as imaging elements, a lens having a prescribed open aperture value and a prescribed focal distance and any of various sensors such as a charge-coupled device (CCD) or a complementary metal oxide semiconductor (CMOS).

Under the control by the arithmetic processing apparatus 20 described later, the light-section image generation apparatus 10 performs the processing of applying linear laser light, the processing of imaging a light-section line, etc. at a prescribed time interval, and generates a plurality of light-section images. The light-section image generated by the light-section image generation apparatus 10 is outputted to the arithmetic processing apparatus 20.

In shape inspection processing using the light-section method, as described above, it is important to change the relative positional relationship between the object to be measured S and the light-section image generation apparatus 10 at appropriate times. The change of the positional relationship is performed by the driving mechanism 30 such as various driving rollers and actuators, under the control of the arithmetic processing apparatus 20.

The arithmetic processing apparatus 20 acquires a light-section image generated by the light-section image generation apparatus 10 and performs known processing like that disclosed in Patent Literature 1 above on the acquired light-section image, and thereby generates a luminance image and an unevenness image. After that, the arithmetic processing apparatus 20 performs prescribed image processing on the generated luminance image and unevenness image, and thereby generates information showing the surface shape of the object to be measured S. The arithmetic processing apparatus 20 functions also as a control unit that controls imaging processing (in other words, the processing of generating a light-section image) in the light-section image generation apparatus 10.

The arithmetic processing apparatus 20 includes, as schematically shown in FIG. 1, an imaging control unit 21, an image processing unit 23, a display control unit 25, and a storage unit 27, for example.

The imaging control unit 21 is configured with a central processing unit (CPU), a read-only memory (ROM), a random access memory (RAM), a communication device, etc. The imaging control unit 21 controls the imaging of the object to be measured S performed by the light-section image generation apparatus 10. More specifically, when the relative movement of the object to be measured S and the optical system (that is, the light-section image generation apparatus 10) is started by the driving mechanism 30 (e.g., a driving motor, an actuator, or the like) under control, the imaging control unit 21 sends a control signal like the following to the light-section image generation apparatus 10. That is, the imaging control unit 21 sends a trigger signal for starting the application of linear laser light to the laser light source 11 of the light-section image generation apparatus 10, and sends a trigger signal for starting the processing of capturing a captured image of a light-section line (that is, a light-section image) to the imaging apparatus 13.

The image processing unit 23 is configured with, for example, a CPU, a ROM, a RAM, a communication device, etc. The image processing unit 23 performs various pieces of image processing using a light-section image acquired from the imaging apparatus 13 of the light-section image generation apparatus 10.

More specifically, the image processing unit 23 uses a light-section image outputted from the light-section image generation apparatus 10 to generate a luminance image and an unevenness image like those disclosed in Patent Literature 1 above. After that, the image processing unit 23 uses the generated luminance image and unevenness image to perform shape inspection processing of calculating the surface shape of the object to be measured S and detecting various defects or the like that may exist on the surface of the object to be measured S.

On finishing the shape inspection processing of the surface of the object to be measured S, the image processing unit 23 transmits information on the obtained inspection result to the display control unit 25.

The display control unit 25 is configured with, for example, a CPU, a ROM, a RAM, an output device, etc. The display control unit 25 performs display control at the time of displaying the inspection result of the object to be measured S transmitted from the image processing unit 23 on an output device such as a display included in the arithmetic processing apparatus 20, an output device provided outside the arithmetic processing apparatus 20, or the like. Thereby, the user of the shape inspection apparatus 1 can grasp various inspection results concerning the surface shape of the object to be measured S on the spot.

The storage unit 27 is configured with, for example, a RAM, a storage device, or the like included in the arithmetic processing apparatus 20 according to the present embodiment. In the storage unit 27, various parameters, reports on processing still in progress, etc. that need to be saved when the arithmetic processing apparatus 20 according to the present embodiment performs some kind of processing, various databases and programs, etc. are recorded, as appropriate. The imaging control unit 21, the image processing unit 23, the display control unit 25, etc. can freely perform data read/write processing on the storage unit 27.

To obtain an appropriate luminance image using the shape inspection apparatus 1 like that described above, it is important to appropriately obtain a light-section image serving as a basis of a luminance image. Here, to obtain an appropriate light-section image, it is necessary to adjust the thickness and the brightness of the light-section line used to generate a light-section image to a certain range. If neither the thickness nor the brightness of the light-section line is appropriate, problems such as (1) to (4) below arise.

(1) In the case where the light-section line is too dark: the luminance image generated using the light-section image is dark as a whole, and surface shape information cannot be obtained appropriately.

(2) In the case where the light-section line is too bright: halation (blown-out highlights) occurs in the luminance image generated using the light-section image.

(3) In the case where the light-section line is too thin: noise is superimposed in the luminance image generated using the light-section image.

(4) In the case where the light-section line is too thick: the space resolution of the luminance image and the unevenness image generated using the light-section image is reduced, and the accuracy of surface shape information is reduced.

Here, the reason why the problems of (1) and (2) above arise is clear; but a description is probably required regarding the reason why the problems of (3) and (4) above arise, and this is specifically described below with reference to FIG. 3 to FIG. 6.

FIG. 3 is an example of the appropriate luminance image generated from a light-section image in which an appropriately set light-section line is imaged, and FIG. 4 is an example of the luminance image with noise superimposed therein that is generated from a light-section image in which too thin a light-section line is imaged. In an appropriate luminance image like that shown in FIG. 3, the brightness and darkness of the light-section line changes in accordance with the surface state of the object to be measured S, and thereby the brightness and darkness of the light-section line is converted to the luminance value of the luminance image. However, as shown in FIG. 4, in the case where too thin a light-section line is used, a striped pattern extending in a direction (the vertical direction in FIG. 4) orthogonal to the extending direction of the light-section line is superimposed in the luminance image.

Noise superimposed in the luminance image like that shown in FIG. 4 (a striped pattern) does not exist in the original luminance image; in the case where, for example, this luminance image is used for a visual surface inspection or the like, a problem that a defect such as a flaw that may exist on the surface of the object to be measured S is hard to see arises. Even in the case where a surface inspection is performed after various pieces of image processing are performed on this luminance image, detection accuracy is reduced due to the superimposed noise of a striped pattern.

A cause of the occurrence of such noise of a striped pattern is derived from the structure of the imaging element. FIG. 5 is an explanatory diagram schematically showing the pixel structure of a common imaging element. In the common imaging element, it is not always the case that the whole pixel is formed as a light receiving unit, but the area of the light receiving unit in each pixel is limited as schematically shown in FIG. 5. Furthermore, an electric circuit for outputting an electrical signal corresponding to the light received by the light receiving unit needs to be formed in the pixel; thus, as shown in FIG. 5, there are few cases where the light receiving unit is formed in a central portion of the pixel.

In the case where an image of too thin a light-section line is formed in a common imaging element having such a pixel, as schematically shown in FIG. 5 there are a pixel in which the light-section line is formed as an image in the light receiving unit and a pixel in which the light-section line is formed as an image in a place where the light receiving unit is not present. Presumably it is because of this that noise of a striped pattern is superimposed in the luminance image as shown in FIG. 4.

Further, in the case where the light-section line is too thick like (4) above, when thought is given to the distribution of luminance along the width direction of the light-section line (the y-axis direction in FIG. 6), there is influence due to speckle noise of laser light because the light-section line is thick. As a result, unlike a light-section line in an appropriate state, a plurality of portions (y-coordinate positions) giving peaks of luminance value exist. Consequently, if the calculation of the centroid position like that disclosed in Patent Literature 1 is performed in order to generate an unevenness image, a variation occurs in the centroid position and the accuracy of surface shape information is reduced. Speckle noise is a problem peculiar to laser light, and appears regardless of the surface roughness of the object to be measured S. Hence, an accuracy reduction of surface shape information due to the fact that the light-section line is too thick always occurs regardless of the object to be measured S.

(With Regard to Studies by Present Inventors)

The present inventors conducted extensive studies on problems like those shown in (1) to (4) above derived from the brightness and the thickness of the light-section line. Influence given by the brightness and the thickness of the light-section line is as schematically shown in the left side of FIG. 7. FIG. 7 is an explanatory diagram for describing the brightness and the thickness of the light-section line.

Ranges of the brightness of the light-section line in which the problems of (1) and (2) above arise can be expressed as shown in the upper part on the left side of FIG. 7. Thus, the range of the brightness of an appropriate light-section line is a region defined by a certain upper limit value and a certain lower limit value in regard to the brightness of the light-section line. Similarly, ranges of the thickness of the light-section line in which the problems of (3) and (4) above arise can be expressed as shown in the lower part on the left side of FIG. 7. Thus, the range of the thickness of an appropriate light-section line is a region defined by a certain upper limit value and a certain lower limit value in regard to the thickness of the light-section line.

Hence, a range of the brightness and the thickness of the light-section line in which none of the problems of (1) to (4) above occur is supposed to exist in a region like that marked with the double circle sign in the right figure of FIG. 7. Thus, if a region giving an appropriate light-section line can be objectively defined, an appropriate light-section image and further an appropriate luminance image can be acquired by adjusting the light-section image generation apparatus 10 so that the thickness and the brightness of the light-section line are within that region.

The problems of (1) to (4) described above are derived only from the thickness and the brightness of the light-section line present in the light-section image. The thickness and the brightness of the light-section line are determined by the optical system and the imaging conditions of the light-section image generation apparatus 10 and the reflection characteristics of the object to be measured S; however, the region marked with the double circle sign in the right figure of FIG. 7 is always a fixed range regardless of the optical system, the imaging conditions, or the reflection characteristics of the object to be measured S (in other words, regardless of the type of the object to be measured S or the specifications of the laser light source or the imaging apparatus), for the reason described later. As described later, the proper region of the thickness and the brightness marked with the double circle sign is specifically provided by the present invention. Thus, the practitioner of the present invention does not need to calculate an proper region separately. That is, the practitioner of the present invention can always obtain an appropriate luminance image and an appropriate unevenness image by simply making adjustment so that the thickness indicator value and the brightness indicator value for a desired object to be measured exist in an proper region.

Thus, on the basis of findings like those mentioned above, the present inventors conducted studies on indicator values related to the brightness and the thickness of the light-section line that can objectively define the region marked with the double circle sign in the right figure of FIG. 7. As a result, the present inventors have arrived at a "brightness indicator value" and a "thickness indicator value" like those described below, and have defined the region marked with the double circle sign in the right figure of FIG. 7 using these two kinds of indicator values. Based on this, the present inventors have completed a method for evaluating a light-section image and a method for adjusting a light-section image generation apparatus like those described below.

Embodiments

In the following, a shape inspection apparatus according to an embodiment of the present invention completed on the basis of the findings mentioned above is described in detail.
<With Regard to Configuration of Shape Inspection Apparatus>

First, the configuration of a shape inspection apparatus 100 according to the present embodiment is described in detail with reference to FIG. 8A to FIG. 11.

Figure 8A:
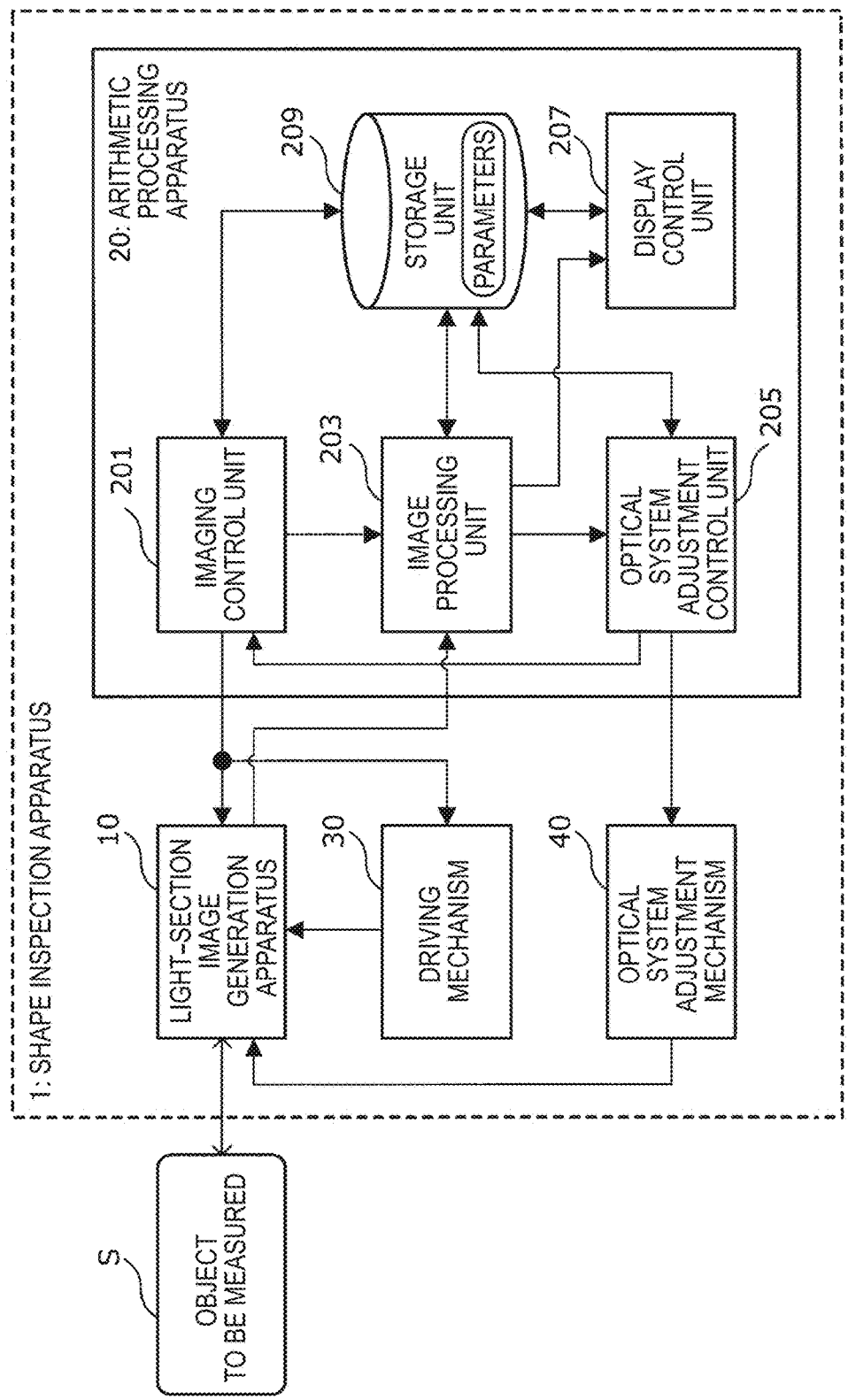
FIG. 8A is a block diagram schematically showing an example of the configuration of a shape inspection apparatus according to an embodiment of the present invention.
Figure 8B:
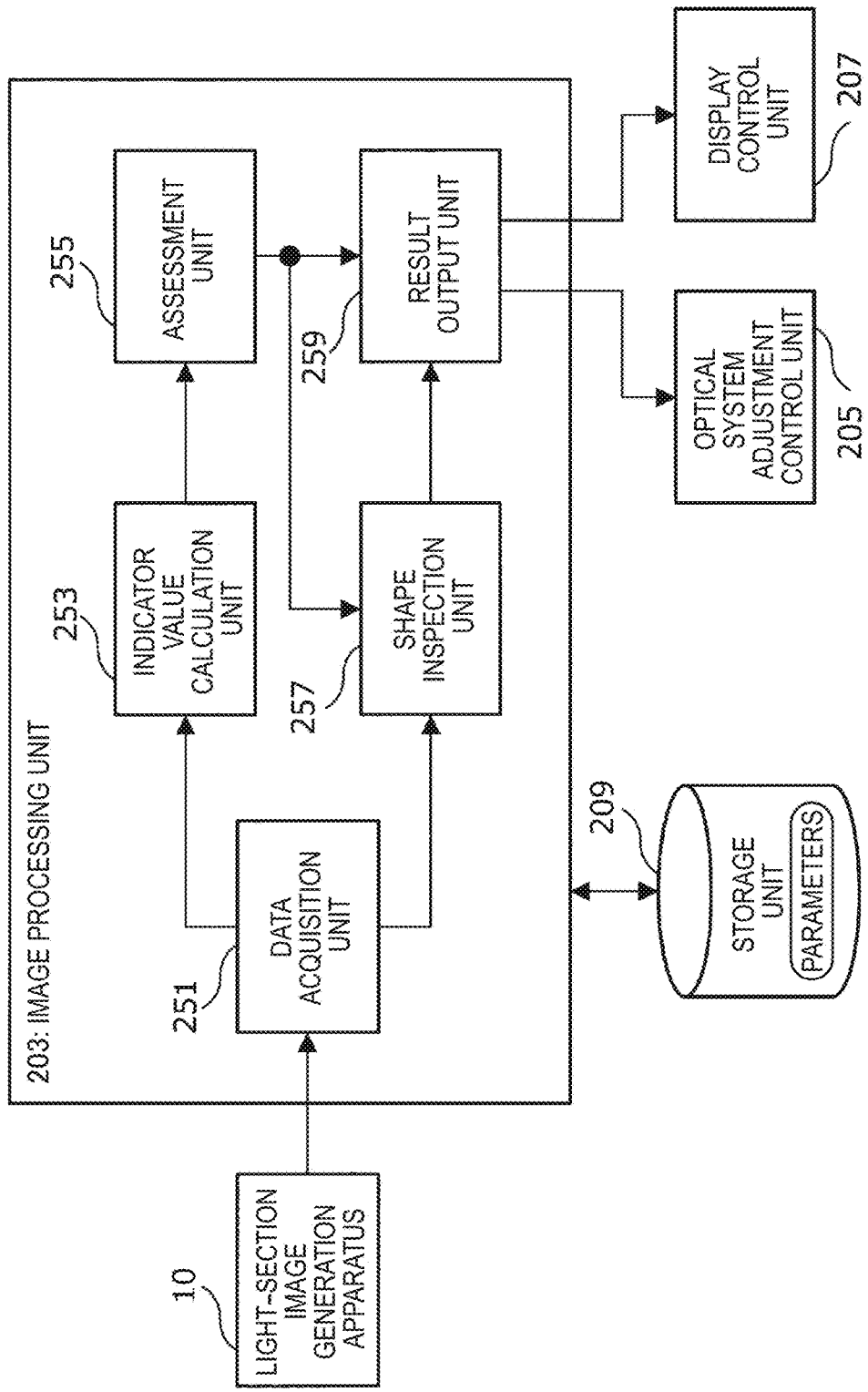
FIG. 8B is a block diagram schematically showing an example of the configuration of a shape inspection apparatus according to an embodiment of the present invention.
Figure 10:
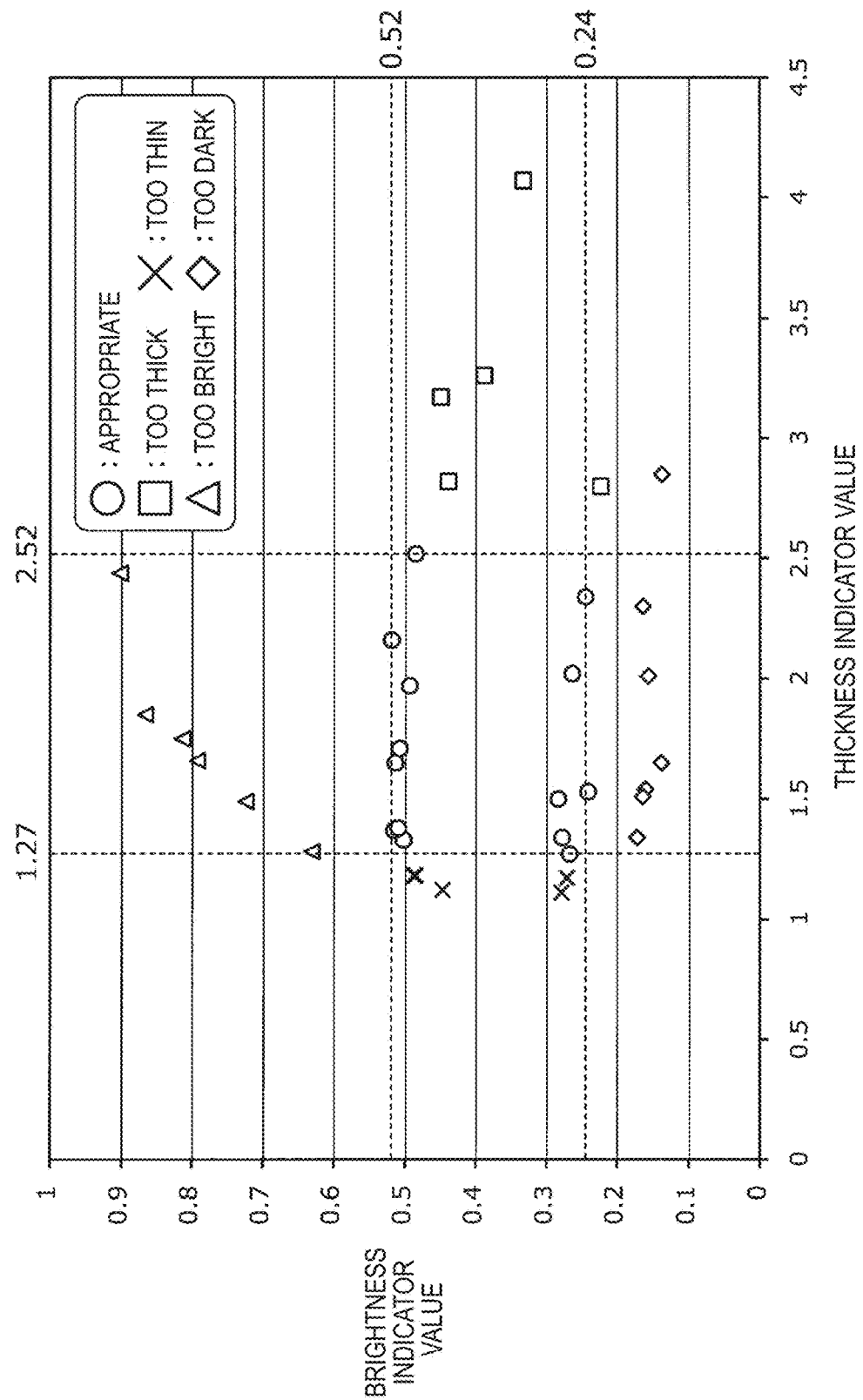
FIG. 10 is a graph for describing a brightness indicator value and a thickness indicator value according to the embodiment.

FIG. 8A and FIG. 8B are block diagrams schematically showing an example of the configuration of a shape inspection apparatus according to the present embodiment, and FIG. 9 is an explanatory diagram for describing indicator value calculation processing according to the present embodiment. FIG. 10 is a graph for describing a brightness indicator value and a thickness indicator value according to the present embodiment, and FIG. 11 is an explanatory diagram for describing the brightness indicator value and the thickness indicator value according to the present embodiment.

The shape inspection apparatus 1 according to the present embodiment is an apparatus in which a shape inspection apparatus using the light-section method like that shown in FIG. 1 is further mounted with the function of evaluating a light-section line and a mechanism for adjusting the optical system of the light-section image generation apparatus 10.

The shape inspection apparatus 1 according to the present embodiment mainly includes, as shown in FIG. 8A, the light-section image generation apparatus 10, the arithmetic processing apparatus 20, the driving mechanism 30, and an optical system adjustment mechanism 40.

Here, the light-section image generation apparatus 10 included in the shape inspection apparatus 1 according to the present embodiment has a similar configuration and exhibits similar functions to the light-section image generation apparatus 10 included in a common shape inspection apparatus like that described with reference to FIG. 1 and FIG. 2. Therefore, a detailed description is omitted in the following.

Also the driving mechanism 30 included in the shape inspection apparatus 1 according to the present embodiment is similar to the driving mechanism 30 included in a common shape inspection apparatus like that described with reference to FIG. 1, and a detailed description is omitted in the following.

The arithmetic processing apparatus 20 according to the present embodiment acquires a light-section image generated by the light-section image generation apparatus 10, and uses the acquired light-section image to evaluate whether the light-section line has an appropriate thickness and an appropriate brightness or not. In the case where it is assessed that the light-section line does not have an appropriate thickness or an appropriate brightness, the optical system of the light-section image generation apparatus 10 (that is, various units etc. constituting the laser light source and the imaging apparatus in the light-section image generation apparatus 10) is adjusted so that the light-section line has an appropriate thickness and an appropriate brightness.

Further, the arithmetic processing apparatus 20 according to the present embodiment acquires a light-section image generated using a light-section line having an appropriate thickness and an appropriate brightness, and performs known processing like that disclosed in Patent Literature 1 above on the acquired light-section image; and thereby generates a luminance image and an unevenness image. After that, the arithmetic processing apparatus 20 performs prescribed image processing on the generated luminance image and unevenness image, and thereby generates information showing the surface shape of the object to be measured S. The arithmetic processing apparatus 20 functions also as a control unit that controls imaging processing in the light-section image generation apparatus 10 (in other words, the processing of generating a light-section image).

The arithmetic processing apparatus 20 having such functions mainly includes, as shown in FIG. 8A, an imaging control unit 201, an image processing unit 203, an optical system adjustment control unit 205, a display control unit 207, and a storage unit 209.

The imaging control unit 201 is configured with a CPU, a ROM, a RAM, a communication device, etc. The imaging control unit 201 controls the imaging of the object to be measured S performed by the light-section image generation apparatus 10. More specifically, when a reference plate described later or the object to be measured S is placed in a position to be irradiated with a light-section line for thickness adjustment and brightness adjustment, the imaging control unit 201 sends a trigger signal for starting the application of linear laser light to the laser light source 11 of the light-section image generation apparatus 10, and sends a trigger signal for starting the processing of capturing a captured image of a light-section line (light-section image) to the imaging apparatus 13.

Further, the imaging control unit 201 can change controllable ones of the operating states of the laser light source 11 and the imaging apparatus 13 constituting the light-section image generation apparatus 10 under control, in cooperation with the optical system adjustment control unit 205 and the optical system adjustment mechanism 40 described later, as appropriate.

Further, when thickness adjustment and brightness adjustment are completed and then the relative movement of the object to be measured S and the light-section image generation apparatus 10 is started by the driving mechanism 30 (e.g., a driving motor, an actuator, or the like) under control, the imaging control unit 201 sends a trigger signal for starting the application of linear laser light to the laser light source 11 of the light-section image generation apparatus 10, and sends a trigger signal for starting the processing of capturing a captured image of a light-section line (light-section image) to the imaging apparatus 13.

The image processing unit 203 is configured with, for example, a CPU, a ROM, a RAM, etc. The image processing unit 203 performs prescribed image processing on a light-section image generated by the light-section image generation apparatus 10, evaluates the light-section line present in the light-section image, and performs a shape inspection of the surface of the object to be measured S. A detailed configuration of the image processing unit 203 is described later.

The optical system adjustment control unit 205, which is an example of the adjustment control unit, is configured with, for example, a CPU, a ROM, a RAM, a communication device, etc. The optical system adjustment control unit 205 is a processing unit that controls the optical system adjustment mechanism 40 for adjusting the optical system of the light-section image generation apparatus 10 (that is, various units etc. constituting the laser light source 11 and the imaging apparatus 13) on the basis of the evaluation result of the light-section line by the image processing unit 203. The optical system adjustment control unit 205 may control the optical system adjustment mechanism 40 in cooperation with the imaging control unit 201, as necessary. For example, the optical system adjustment control unit 205 may allow the imaging control unit 201 to adjust the condition of the optical system of the light-section image generation apparatus 10 that can be adjusted by the imaging control unit 201, and may control the optical system adjustment mechanism 40 in order to adjust the condition of the optical system that is hard for the imaging control unit 201 to adjust.

Here, the optical system adjustment mechanism 40, which is an example of the adjustment mechanism, is composed of a driving motor, an actuator, or the like provided in order to change the operating state of the laser light source 11 and the imaging apparatus 13. Under the control of the optical system adjustment control unit 205, the optical system adjustment mechanism 40 actually adjusts the optical system of the light-section image generation apparatus 10; thereby, the thickness and the brightness of the light-section line can be adjusted to an appropriate state.

A specific control method performed by the optical system adjustment control unit 205 is described later.

The display control unit 207 is configured with, for example, a CPU, a ROM, a RAM, an output device, etc. The display control unit 207 performs display control at the time of displaying the evaluation result of the light-section line and the inspection result of the object to be measured S transmitted from the image processing unit 203 on an output device such as a display included in the arithmetic processing apparatus 20, an output device provided outside the arithmetic processing apparatus 20, or the like. Thereby, the user of the shape inspection apparatus 1 can grasp the evaluation result of the light-section line, various inspection results concerning the surface shape of the object to be measured S, etc. on the spot.

The storage unit 209 is configured with, for example, a RAM, a storage device, or the like included in the arithmetic processing apparatus 20 according to the present embodiment. In the storage unit 209, various pieces of information that the image processing unit 203 uses to evaluate the light-section line are stored. Further, in the storage unit 209, various parameters, reports on processing still in progress, etc. that need to be saved when the arithmetic processing apparatus 20 according to the present embodiment performs some kind of processing, various databases and programs, etc. are recorded, as appropriate. The imaging control unit 201, the image processing unit 203, the optical system adjustment control unit 205, the display control unit 207, etc. can freely perform data read/write processing on the storage unit 209.

Next, an example of the configuration of the image processing unit 203 included in the arithmetic processing apparatus 20 according to the present embodiment is described in detail with reference to FIG. 8B.

The image processing unit 203 according to the present embodiment mainly includes, as shown in FIG. 8B, a data acquisition unit 251, an indicator value calculation unit 253, an assessment unit 255, a shape inspection unit 257, and a result output unit 259.

The data acquisition unit 251 is configured with, for example, a CPU, a ROM, a RAM, a communication device, etc. The data acquisition unit 251 acquires, from the light-section image generation apparatus 10, image data of a light-section image generated by the light-section image generation apparatus 10. The data acquisition unit 251 outputs the acquired image data of a light-section image to the indicator value calculation unit 253 and the shape inspection unit 257 described later.

The indicator value calculation unit 253 is configured with, for example, a CPU, a ROM, a RAM, etc. The indicator value calculation unit 253 uses the light-section image outputted from the data acquisition unit 251 to calculate a thickness indicator value indicating the thickness of the light-section line and a brightness indicator value indicating the brightness of the light-section line in the light-section image.

More specifically, the indicator value calculation unit 253 first specifies a pixel giving the maximum luminance value in each of the column directions in the pixel arrangement of the light-section image (the height directions of the light-section image) that are directions corresponding to the relative movement direction of the object and the laser light source. At this time, when the pixel giving the maximum luminance value of a column has a luminance value not less than a first threshold, that focused-on column is referred to as a pixel column to be processed. These pixel columns to be processed are used to calculate indicator values described later. In other words, a column in which the maximum luminance value is less than the first threshold is excluded from the calculation of indicator values described later. Here, the specific value of the first threshold at the time of specifying the pixel column to be processed is not particularly limited, and may be set to, for example, approximately 10% (for example, in the case where 8 bit of data are outputted, the luminance value=approximately 20) of the maximum output luminance value possibly outputted from the imaging apparatus 13 (for example, in the case where 8 bit of data are outputted, the maximum output luminance value=255).

After that, the indicator value calculation unit 253 specifies a pixel having a luminance value not less than a second threshold with respect to the maximum luminance value of each pixel column to be processed. After that, in each pixel column to be processed, the indicator value calculation unit 253 takes, as the thickness of the light-section line in the focused-on pixel column to be processed, the sum of the number of pixels giving the specified maximum luminance value and the number of pixels that are pixels other than the pixel having the maximum luminance value and have a luminance value not less than the second threshold. That is, the thickness of the light-section line is expressed using, as the unit, the size of pixels in the light-section image. After that, the indicator value calculation unit 253 calculates the average of the thicknesses of the light-section line in the pixel columns to be processed for the width direction of the light-section image, and takes the average as a thickness indicator value. Here, the second threshold mentioned above is defined as a coefficient that is multiplied with the maximum luminance value in each position in the extending direction; the specific value thereof is not particularly limited, and may be set to, for example, approximately 70% (that is, 0.7).

In the following, a method for calculating the thickness indicator value is specifically described with reference to FIG. 9.

At this moment, it is assumed that a light-section image in which the number of pixels is as shown in FIG. 9 exists, and a light-section line extends so as to be parallel to the width direction of the light-section image shown in FIG. 9 (the row direction of the pixel arrangement). Here, it is assumed that, as a result of the fact that the indicator value calculation unit 253 has specified the pixel column to be processed using the first threshold, the pixel columns are assessed as being the pixel column to be processed except for the 2nd column from the right in FIG. 9. After that, the indicator value calculation unit 253 sequentially specifies the thickness of the light-section line in the positions in the width direction of the light-section image (the extending direction of the light-section line). It is assumed that, when attention is focused on the pixel column located on the leftmost side in FIG. 9, the pixel giving the maximum luminance value in the pixel column on the leftmost side is the 2nd pixel from the top, and the pixel having a luminance value not less than the second threshold with respect to the maximum luminance value is the 3rd pixel from the top. In this case, the indicator value calculation unit 253 assesses that the thickness of the light-section line in the pixel column located on the leftmost side is 2 pixels. The indicator value calculation unit 253 performs similar processing on each pixel column to be processed; thereby, a thickness on a pixel basis like that shown in FIG. 9 is specified. After that, the indicator value calculation unit 253 calculates the average value of the thicknesses specified in the above manner for all the pixel columns to be processed mentioned above. In the example shown in FIG. 9, while the 2nd column from the right, which is not to be processed, is excluded, the total of the thicknesses is 2+2+4+2+5+2=17 pixels, and the number of pixel columns to be processed is 6; accordingly, the average value of thickness treated as the thickness indicator value is 17÷6≈2.8. Thus, the thickness indicator value according to the present embodiment is the average value of the thicknesses of the light-section line in pixel columns to be processed (a direction orthogonal to the width direction of the light-section image (the extending direction of the light-section line)). The procedure described above of finding the thickness indicator value can be applied completely similarly even to the case where the extending direction of the light-section line is not strictly parallel to the width direction of the light-section image.

Further, the indicator value calculation unit 253 divides the average of the luminance values in the pixels giving the maximum luminance value in the pixel columns assessed as the pixel column to be processed that have been used in the calculation of the thickness indicator value like that mentioned above and the pixels having a luminance value not less than the second threshold with respect to the maximum luminance value by the maximum output luminance value possibly outputted from the imaging apparatus 13, and takes the average as a brightness indicator value. In the example shown in FIG. 9, the average value of the luminance values in the 17 pixels that have been used in the averaging operation of the thickness indicator value is divided by the maximum output luminance value possibly outputted from the imaging apparatus 13, and thereby the brightness indicator value is calculated. Thus, the brightness indicator value according to the present embodiment is a value obtained by dividing the average of the luminance values possessed by pixels that have been used in the calculation of the thickness indicator value by the maximum output luminance value possibly outputted from the imaging apparatus 13.

Here, a light-section line is present in the light-section image focused on in the present embodiment as a result of the fact that the optical system and the photographing conditions of the light-section image generation apparatus 10 and the reflection characteristics of the object to be measured S are reflected. That is, the thickness indicator value and the brightness indicator value defined in the above manner are values depending on the optical system, the photographing conditions, and the reflection characteristics of the object to be measured S. On the other hand, the proper region of thickness and brightness shown by the double circle sign of FIG. 7 is always fixed regardless of the optical system, the photographing conditions, or the reflection characteristics of the object to be measured S. The reasons will now be described in order.

First, the reason why noise of a striped pattern occurs in the luminance image is that the light-section line is too thin to be formed as an image in all the light receiving units of the imaging element. Next, the reason why the accuracy of surface shape information is reduced is that a plurality of peak points of luminance value exist due to speckle noise peculiar to a laser that occurs due to the fact the light-section line on the imaging element it too thick. That is, the problems mentioned above are caused only by the thickness of the light-section line. In other words, the problems mentioned above do not arise as long as the thickness indicator value of the light-section line is within a range of upper and lower limits that are always fixed, such as one not depending on the optical system, the photographing conditions, or the reflection characteristics of the object to be measured S.

On the other hand, the reason why a luminance image in which halation occurs or that is too dark is obtained is that the light-section line is too bright or too dark. These problems are caused only by the brightness (i.e., luminance value) of the light-section line with respect to the maximum output luminance value possibly outputted from the imaging apparatus 13. In other words, these problems do not arise as long as the brightness indicator value of the light-section line is set in a range of upper and lower limits that are always fixed, such as one not depending on the optical system, the photographing conditions, or the reflection characteristics of the object to be measured S.

As described later, in the present invention, an proper region of thickness and brightness is specifically provided. Thus, the practitioner of the present invention does not need to calculate an proper region separately, and needs only to calculate the thickness indicator value and the brightness indicator value for a desired object to be measured and check whether each indicator value exists in an proper region provided by the present invention or not.

In order for the indicator value calculation unit 253 to calculate the thickness indicator value and the brightness indicator value, it is not always necessary to generate a plurality of light-section images formed of a light-section line based on the relative movement of the object to be measured S and the light-section image generation apparatus 10 for use in a shape inspection or the like, which is an original object of light-section image generation, and the thickness indicator value and the brightness indicator value can be calculated even from one captured image of a light-section line on an object to be measured S at rest (that is, one light-section image). Thus, both indicator values can be simply calculated while the object to be measured S is fixed without performing the relative movement by the driving mechanism 30.

The indicator value calculation unit 253 outputs the two kinds of indicator values calculated in the above manner to the assessment unit 255 and the result output unit 259 described later.

Returning to FIG. 8B again, the assessment unit 255 according to the present embodiment is described.

The assessment unit 255 is configured with, for example, a CPU, a ROM, a RAM, etc. On the basis of the thickness indicator value and the brightness indicator value calculated by the indicator value calculation unit 253, the assessment unit 255 assesses whether each of the thickness indicator value and the brightness indicator value is within a prescribed range or not. Here, the ranges of the thickness indicator value and the brightness indicator value used for the assessment are ranges that define the boundary of the region shown by the double circle sign in the right figure of FIG. 7.

To specify specific ranges of the thickness indicator value and the brightness indicator value like those mentioned above, the present inventors used a slab that was known to be flat and have a uniform surface and cut out a plurality of samples from the slab. After that, using the shape inspection apparatus 1 like that shown in FIG. 1, the present inventors generated a plurality of light-section images while intentionally changing the brightness and the thickness of the light-section line, and calculated the unevenness shape of the sample using the obtained light-section image. At this time, the presence or absence of noise and brightness and darkness were assessed for a luminance image generated from the obtained light-section image by a skilled inspector who performs a visual inspection in the actual operation. Further, the scattering of unevenness depths of the surface was calculated using the calculated unevenness shape and a known surface shape. The reduction in shape measurement accuracy can be found by focusing on the scattering of unevenness depths. Specifically, in the case where the light-section line is too thick, the thickness of the light-section line has a larger depth scattering value than in an appropriate case; thus, whether the thickness of the light-section line is too thick or not can be assessed by investigating the depth scattering value.

The distribution of the brightness indicator value and the thickness indicator value for 37 samples is shown in FIG. 10. In FIG. 10, the plot shown by the circle sign corresponds to a sample that was assessed by the inspector as "being an appropriate luminance image and also the value of the depth scattering mentioned above being appropriate." The plot shown by the square sign corresponds to a sample that was assessed from the value of the depth scattering as "the light-section line being too thick," and the plot shown by the x-sign corresponds to a sample that was assessed by the inspector as "noise being superimposed" like that shown in FIG. 4. The plot shown by the triangle sign corresponds to a sample that was assessed by the inspector as "halation having occurred in the luminance image," and the plot shown by the rhombus sign corresponds to a sample that was assessed by the inspector as "the luminance image being too dark." FIG. 11 describes the scattering of unevenness depths calculated for the 37 samples mentioned above, along with specific values of the brightness indicator value and the thickness indicator value.

When attention is focused on FIG. 11, it can be seen that, in a sample with a thickness indicator value of 2.80 or more, the value of the depth scattering was more than 10 and measurement accuracy was reduced. Thus, in the present embodiment, the upper limit value of the thickness indicator value is set to 2.52 in order to eliminate the reduction in measurement accuracy more reliably.

When attention is focused on FIG. 10 and FIG. 11, it can be seen that, in a sample with a thickness indicator value of 1.18 or less, noise of a striped pattern was observed, and the assessment result was "the light-section line being too thin." Thus, in the present embodiment, the lower limit value of the thickness indicator value is set to 1.27 in order to prevent the superimposition of noise more reliably. As described above, the reduction in measurement accuracy or the occurrence of noise in the luminance image is caused only by the thickness of the light-section line. Hence, even when similar operation is performed using different photographing conditions or different objects to be measured, the result of the upper and lower limits of the thickness indicator value obtained here does not change.

On the other hand, referring to FIG. 10 and FIG. 11, it can be seen that, in a sample with a brightness indicator value of 0.63 or more, halation was observed, and the assessment result was "the light-section line being too bright." Thus, in the present embodiment, the upper limit value of the brightness indicator is set to 0.52 in order to prevent the occurrence of halation more reliably.

Referring to FIG. 10 and FIG. 11, it can be seen that, in a sample with a brightness indicator value of 0.17 or less, the luminance image was darkened as a whole, and the assessment result was "the light-section line being too dark." Thus, in the present embodiment, the lower limit value of the brightness indicator is set to 0.24 in order to prevent the darkening of the luminance image more reliably.

On the other hand, a sample in which the thickness indicator value was within the range of 1.27 to 2.52 and the brightness indicator value was within the range of 0.24 to 0.52 was assessed as "an appropriate luminance image being obtained," as is clear from FIG. 10 and FIG. 11. As described above, the occurrence of halation or the generation of too dark a luminance image is caused only by the brightness (luminance value) of the light-section line. Hence, even when similar operation is performed using different photographing conditions or different objects to be measured, the result of the upper and lower limits of the brightness indicator value obtained here does not change.

From the above findings, the present inventors have defined, as a region showing that the thickness and the brightness of the light-section line are in an appropriate state, a region in which the thickness indicator value is within the range of 1.27 to 2.52 and the brightness indicator value is within the range of 0.24 to 0.52 (hereinafter, occasionally referred to as an "proper region"). As mentioned above, the proper region mentioned above does not depend on the type of the object to be measured or the specifications of the laser light source or the imaging apparatus, but is usable for many purposes. Information on the proper region is stored in the storage unit 209, for example.

From the above findings, the assessment unit 255 according to the present embodiment refers to information on the proper region stored in the storage unit 209, and assesses whether the thickness indicator value and the brightness indicator value calculated by the indicator value calculation unit 253 are within the proper region or not. In the case where the result of assessment shows that the two indicator values are within the proper region mentioned above, the assessment unit 255 assesses that the thickness and the brightness of the light-section line are appropriate and the light-section image is captured properly; and in the case where neither of the two indicator values is within the proper region mentioned above, the assessment unit 255 assesses that neither the thickness nor the brightness of the light-section line is appropriate and the light-section image is not captured properly.

Further, in the case where in the assessment processing mentioned above the assessment unit 255 has assessed that at least one of the thickness indicator value and the brightness indicator value is not included in the proper region mentioned above, the assessment unit 255 may create guidance on the adjustment of the light-section image generation apparatus 10 on the basis of the calculated indicator values. For example, in the case where the thickness indicator value is less than the lower limit value, the assessment unit 255 creates guidance so as to adjust the light-section image generation apparatus 10 so that the thickness of the light-section line becomes thicker; and in the case where the thickness indicator value is more than the upper limit value, the assessment unit 255 creates guidance so as to adjust the light-section image generation apparatus 10 so that the thickness of the light-section line becomes thinner. Similarly, for example, in the case where the brightness indicator value is less than the lower limit value, the assessment unit 255 creates guidance so as to adjust the light-section image generation apparatus 10 so that the brightness of the light-section line becomes brighter; and in the case where the brightness indicator value is more than the upper limit value, the assessment unit 255 creates guidance so as to adjust the light-section image generation apparatus 10 so that the brightness of the light-section line becomes darker.

Further, in order to bring the thickness indicator value within the proper region, the assessment unit 255 may create, as more detailed guidance, guidance that adjusts at least one of the focus of the lens included in the imaging apparatus 13, the focus of the lens included in the laser light source 11, and the separation distance between the laser light source 11 and a reference plate described later. Similarly, in order to bring the brightness indicator value within the proper region, the assessment unit 255 may create, as more detailed guidance, guidance that adjusts at least one of the exposure time of the imaging apparatus 13, the aperture of the lens included in the imaging apparatus 13, the gain of the imaging apparatus 13, and the power of the laser light source 11.

The assessment unit 255 outputs information showing assessment result based on two indicator values like those mentioned above to the result output unit 259. In the case where the assessment unit 255 has created adjustment guidance like those mentioned above, the assessment unit 255 outputs information showing the adjustment guidance to the result output unit 259.

It is preferable for the assessment unit 255 to output information showing assessment result based on two indicator values like those mentioned above to the shape inspection unit 257 described later. As described above, in the case where a shape inspection is performed on the basis of a light-section image generated when the state of the light-section line is not appropriate, it is highly likely that many errors will be superimposed in the inspection accuracy.

Thus, it is preferable for the shape inspection unit 257 described later to refer to information showing assessment result outputted from the assessment unit 255 and perform shape inspection processing in the case where the information shows that the state of the light-section line is appropriate.

The proper region set in the above manner is determined on the basis of the thickness indicator value and the brightness indicator value, which are general-purpose indicators, and also the set proper region is a region usable for many purposes. Therefore, all shape inspection apparatuses 1 based on the light-section method and all light-section image generation apparatuses 10 provided in the shape inspection apparatus 1 can achieve an appropriate state of the light-section line, and can generate an appropriate luminance image and an appropriate unevenness image as long as the thickness indicator value and the brightness indicator value are within the proper region.

Thus, even if the state of the light-section image generation apparatus 10 or the equipment itself is changed in, for example, maintenance etc., it is not necessary to set the proper region separately, and it is sufficient to adjust the apparatus so that the thickness indicator value and the brightness indicator value are within the proper region mentioned above. Further, even in the case where the shape inspection apparatus 1 uses, as measurement objects, different kinds of objects to be measured S, it is sufficient to adjust the light-section image generation apparatus 10 so that the two indicator values are within the proper region mentioned above in a state where a reference plate related to a new object to be measured S is set at rest in the irradiation position of the light-section line.

Thus, in the method according to the present embodiment, the state of the light-section line is assessed on the basis of the thickness indicator value and the brightness indicator value mentioned above; thereby, the relative movement of the object to be measured S and the light-section image generation apparatus 10 becomes unnecessary and the adjustment of the light-section image generation apparatus 10 can be completed very simply and in a short time as compared to conventional adjustment operation based on trial and error in which, while the object to be measured S and the light-section image generation apparatus 10 are relatively moved repeatedly, a luminance image and an unevenness image are checked each time to adjust the light-section image generation apparatus 10.

Returning to FIG. 8B again, the shape inspection unit 257 according to the present embodiment is described.

The shape inspection unit 257 according to the present embodiment is configured with, for example, a CPU, a ROM, a RAM, etc. The shape inspection unit 257 performs a shape inspection of the surface of the object to be measured S using a light-section image generated using a light-section line put in an appropriate state.

More specifically, the shape inspection unit 257 generates a luminance image and an unevenness image like those disclosed in Patent Literature 1 above using a light-section image generated from a light-section line put in an appropriate state. After that, the shape inspection unit 257 uses the generated luminance image and unevenness image to calculate the surface shape of the object to be measured S, or detect various defects or the like that may exist on the surface of the object to be measured S.

Here, the method by which the shape inspection unit 257 calculates the surface shape of the portion to be measured S or detects various defects or the like existing on the surface of the object to be measured S is not particularly limited, and a known method based on the light-section method may be used, as appropriate.

In the shape inspection apparatus 1 according to the present embodiment, adjustment can be easily made on the basis of two indicator values like those described above so that the state of the light-section line becomes an appropriate state. Thus, shape inspection processing with good accuracy can be performed by performing various pieces of shape inspection processing using a light-section image obtained from the light-section line after adjustment.

Information showing the result of various pieces of shape inspection processing performed by the shape inspection unit 257 is outputted to the result output unit 259.

The result output unit 259 is configured with, for example, a CPU, a ROM, a RAM, etc. The result output unit 259 outputs to the display control unit 207 various pieces of information on a light-section image, such as information on the thickness indicator value and the brightness indicator value outputted from the indicator value calculation unit 253, assessment result generated by the assessment unit 255, and information on adjustment guidance, information on shape inspection result outputted from the shape inspection unit 257, etc. Thereby, various pieces of information like those mentioned above are outputted to a display unit (not shown). Further, the result output unit 259 may output the obtained result to an external device such as a process computer system for production management, or may use the obtained result to create various record files. Further, the result output unit 259 may associate various pieces of information like those mentioned above with time information on the date and time at which the information is calculated and on other matters, and may store these pieces of information as history information in the storage unit 209 or the like.

The adjustment manipulation of the light-section image generation apparatus 10 based on the thickness indicator value and the brightness indicator value outputted from the result output unit 259 may be performed by a person on the basis of the values of the thickness indicator value and the brightness indicator value themselves and adjustment guidance. However, since the arithmetic processing apparatus 20 includes the optical system adjustment control unit 205 like that described above, the adjustment manipulation of the light-section image generation apparatus 10 can be automatized.

That is, on the basis of information outputted from the result output unit 259, the optical system adjustment control unit 205 outputs a prescribed control signal to the optical system adjustment mechanism 40 that drives and adjusts the laser light source 11 and the imaging apparatus 13 provided in the light-section image generation apparatus 10 and to the imaging control unit 21 of the arithmetic processing apparatus 20 that controls the laser light source 11 and the imaging apparatus 13, and causes the state of the optical system provided in the light-section image generation apparatus 10 to be adjusted.

Specifically, in order to bring the thickness indicator value within the proper range, the optical system adjustment control unit 205 outputs to the optical system adjustment mechanism 40 a control signal for adjusting at least one of the focus of the lens included in the imaging apparatus 13, the focus of the lens included in the laser light source 11, and the separation distance between the laser light source 11 and a reference plate.

Further, in order to bring the brightness indicator value within the proper range, the optical system adjustment control unit 205 outputs, to at least one of the optical system adjustment mechanism 40 and the imaging control unit 21, a control signal for adjusting at least one of the exposure time of the imaging apparatus 13, the aperture of the lens included in the imaging apparatus 13, the gain of the imaging apparatus 13, and the power of the laser light source 11.

Thereby, in the shape inspection apparatus 1 according to the present embodiment, adjustment processing is performed automatically on the basis of the thickness indicator value and the brightness indicator value so that the state of the light-section line becomes an appropriate state.

An example of the function of the arithmetic processing apparatus 20 according to the present embodiment has been illustrated. Each of the above structural elements may be configured with a general-purpose member or circuit, and may be configured with hardware specialized for the function of each structural element. A CPU or the like may perform all of the functions of respective structural elements. Thus, a utilized configuration can be changed as appropriate, according to the technology level at the time of performing the present embodiment.

Note that the computer program for providing each function of the arithmetic processing apparatus according to the above present embodiment can be created and implemented in a personal computer or the like. Moreover, a computer-readable recording medium that contains this computer program can be provided as well. For example, the recording medium is a magnetic disk, an optical disc, a magneto-optical disk, a flash memory, or the like. The above computer program may be delivered via a network for example, without using the recording medium.

<With Regard to Shape Inspection Method>

Next, a flow of a shape inspection method according to the present embodiment is described in detail with reference to FIG. 12. FIG. 12 is a flow chart showing an example of the flow of a shape inspection method according to the present embodiment.

In a shape inspection method according to the present embodiment, first, one of the object to be measured S itself and a sample that simulates the reflection characteristics of the object to be measured S is used as a reference plate, and the reference plate is placed in the irradiation position of a light-section line. After that, under the control of the imaging control unit 201 of the arithmetic processing apparatus 20, linear laser light starts to be applied from the laser light source 11 of the light-section image generation apparatus 10 (step S101). After that, under the control of the imaging control unit 201 of the arithmetic processing apparatus 20, the imaging apparatus 13 of the light-section image generation apparatus 10 captures a light-section image (step S103). The data acquisition unit 251 of the arithmetic processing apparatus 20 acquires image data of the light-section image generated by the imaging apparatus 13, and outputs the image data to the indicator value calculation unit 253.

The indicator value calculation unit 253 of the arithmetic processing apparatus 20 uses the light-section image outputted from the data acquisition unit 251 to calculate the thickness indicator value and the brightness indicator value by the method described above (step S105). After that, the indicator value calculation unit 253 outputs the calculated thickness indicator value and brightness indicator value to the assessment unit 255.

The assessment unit 255 uses the thickness indicator value and the brightness indicator value calculated by the indicator value calculation unit 253 to perform condition assessment concerning the indicator values (that is, condition assessment of whether the two indicator values are within the proper region or not) (step S107).

In the case where the two indicator values satisfy the condition (that is, in the case where the two indicator values are within the proper region), the assessment unit 255 assesses that the state of the light-section line is proper, and outputs the assessment result to the shape inspection unit 257 and the result output unit 259. On receiving the output, the shape inspection unit 257 performs step S111 described later.

On the other hand, in the case where at least one of the two indicator values does not satisfy the condition, the assessment unit 255 outputs the two indicator values themselves and adjustment guidance to the shape inspection unit 257 and the result output unit 259. The result output unit 259 outputs information showing the two indicator values outputted from the assessment unit 255 and adjustment guidance to the user via the display control unit 207, and outputs the information to the optical system adjustment control unit 205. On the basis of the indicator values and the adjustment guidance, the optical system adjustment control unit 205 causes the optical system adjustment mechanism 40 to adjust the optical system of the light-section image generation apparatus 10, in cooperation with the imaging control unit 201 as necessary (step S111). The adjustment operation of the light-section image generation apparatus 10 may be performed by the manager of the light-section image generation apparatus 10 by human power. After that, the procedure returns to step S103, and the adjustment processing of the light-section image generation apparatus is continued.

Here, in the case where in step S107 it is assessed that the state of the light-section line is proper, the shape inspection unit 257 performs shape inspection processing based on the light-section method on the basis of a light-section image generated by the light-section line put in an appropriate state (step S111). The shape inspection unit 257 outputs information on the obtained shape inspection result to the result output unit 259. The result output unit 259 outputs information on the obtained shape inspection result to the user via the display control unit 207 (step S113). Thereby, the user of the shape inspection apparatus 1 can grasp the shape inspection result of the surface of the focused-on object to be measured S on the spot.

Hereinabove, a flow of a shape inspection method according to the present embodiment is described.

(Hardware Configuration)

Next, the hardware configuration of the arithmetic processing apparatus 20 according to an embodiment of the present invention will be described in detail with reference to FIG. 13. FIG. 13 is a block diagram for explaining the hardware configuration of the arithmetic processing apparatus 20 according to an embodiment of the present invention.

The arithmetic processing apparatus 20 mainly includes a CPU 901, a ROM 903, and a RAM 905. Furthermore, the arithmetic processing apparatus 20 also includes a bus 907, an input device 909, an output device 911, a storage device 913, a drive 915, a connection port 917, and a communication device 919.

The CPU 901 serves as a central processing apparatus and a control device, and controls the overall operation or a part of the operation of the arithmetic processing apparatus 20 according to various programs recorded in the ROM 903, the RAM 905, the storage device 913, or a removable recording medium 921. The ROM 903 stores programs, operation parameters, and the like used by the CPU 901. The RAM 905 primarily stores programs that the CPU 901 uses and parameters and the like varying as appropriate during the execution of the programs. These are connected with each other via the bus 907 configured from an internal bus such as a CPU bus or the like.

The bus 907 is connected to the external bus such as a PCI (Peripheral Component Interconnect/Interface) bus via the bridge.

The input device 909 is an operation means operated by a user, such as a mouse, a keyboard, a touch panel, buttons, a switch and a lever. The input device 909 may be a remote control means (a so-called remote control) using, for example, infrared light or other radio waves, or may be an externally connected apparatus 923 such as a PDA conforming to the operation of the arithmetic processing apparatus 20. Furthermore, the input device 909 generates an input signal based on, for example, information which is input by a user with the above operation means, and is configured from an input control circuit for outputting the input signal to the CPU 901. The user can input various data to the shape inspection apparatus 10 and can instruct the arithmetic processing apparatus 20 to perform processing by operating this input device 909.

The output device 911 is configured from a device capable of visually or audibly notifying acquired information to a user. Examples of such device include display devices such as a CRT display device, a liquid crystal display device, a plasma display device, an EL display device and lamps, audio output devices such as a speaker and a headphone, a printer, a mobile phone, a facsimile machine, and the like. For example, the output device 911 outputs a result obtained by various processes performed by the arithmetic processing apparatus 20. More specifically, the display device displays, in the form of texts or images, a result obtained by various processes performed by the arithmetic processing apparatus 20. On the other hand, the audio output device converts an audio signal such as reproduced audio data and sound data into an analog signal, and outputs the analog signal.

The storage device 913 is a device for storing data configured as an example of a storage unit of the arithmetic processing apparatus 20 and is used to store data. The storage device 913 is configured from, for example, a magnetic storage device such as a HDD (Hard Disk Drive), a semiconductor storage device, an optical storage device, or a magneto-optical storage device. This storage device 913 stores programs to be executed by the CPU 901, various data, and various data obtained from the outside.

The drive 915 is a reader/writer for recording medium, and is embedded in the arithmetic processing apparatus 20 or attached externally thereto. The drive 915 reads information recorded in the attached removable recording medium 921 such as a magnetic disk, an optical disk, a magneto-optical disk, or a semiconductor memory, and outputs the read information to the RAM 905. Furthermore, the drive 915 can write in the attached removable recording medium 921 such as a magnetic disk, an optical disk, a magneto-optical disk, or a semiconductor memory. The removable recording medium 921 is, for example, a CD medium, a DVD medium, or a Blu-ray (registered trademark) medium. The removable recording medium 921 may be a Compact-Flash (CF; registered trademark), a flash memory, an SD memory card (Secure Digital Memory Card), or the like. Alternatively, the removable recording medium 921 may be, for example, an IC card (Integrated Circuit Card) equipped with a non-contact IC chip or an electronic device.

The connection port 917 is a port for allowing devices to directly connect to the arithmetic processing apparatus 20. Examples of the connection port 917 include a USB (Universal Serial Bus) port, an IEEE1394 port, a SCSI (Small Computer System Interface) port, an RS-232C port, and the like. By the externally connected apparatus 923 connecting to this connection port 917, the arithmetic processing apparatus 20 directly obtains various data from the externally connected apparatus 923 and provides various data to the externally connected apparatus 923.

The communication device 919 is a communication interface configured from, for example, a communication device for connecting to a communication network 925. The communication device 919 is, for example, a wired or wireless LAN (Local Area Network), Bluetooth (registered trademark), a communication card for WUSB (Wireless USB), or the like. Alternatively, the communication device 919 may be a router for optical communication, a router for ADSL (Asymmetric Digital Subscriber Line), a modem for various communications, or the like. This communication device 919 can transmit and receive signals and the like in accordance with a predetermined protocol such as TCP/IP on the Internet and with other communication devices, for example. The communication network 925 connected to the communication device 919 is configured from a network and the like, which is connected via wire or wirelessly, and may be, for example, the Internet, a home LAN, an in-house LAN, infrared communication, radio wave communication, satellite communication, or the like.

Heretofore, an example of the hardware configuration capable of realizing the functions of the arithmetic processing apparatus 20 according to an embodiment of the present invention has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST 10 shape inspection apparatus
10 light-section image generation apparatus
20 arithmetic processing apparatus
30 driving mechanism
40 optical system adjustment mechanism
201 imaging control unit
203 image processing unit
205 optical system adjustment control unit
207 display control unit
209 storage unit
251 data acquisition unit
253 indicator value calculation unit
255 assessment unit
257 shape inspection unit
259 result output unit

The invention claimed is:

1. A shape inspection method comprising:
a light-section image generation step in which linear laser light is applied to an object surface from a laser light source and a light-section line based on the laser light on the object surface is imaged by an imaging apparatus, and thereby a light-section image that is a captured image used for a light-section method is generated;
an indicator value calculation step in which a thickness indicator value indicating a thickness of the light-section line and a brightness indicator value indicating a brightness of the light-section line in the light-section image are calculated;
a setting changing step in which setting of at least one of the laser light source and the imaging apparatus is changed so that each of the calculated thickness indicator value and the calculated brightness indicator value is within a prescribed range uniquely set in advance; and
a shape inspection step in which image processing is performed on the light-section image after each of the thickness indicator value and the brightness indicator value is brought within the prescribed range, and thereby a shape of the object surface is inspected,
wherein, in the indicator value calculation step,
a pixel giving a maximum luminance value is specified in each of column directions of a light-section image related to the object surface that are directions corresponding to a relative movement direction of the object and the laser light source, and in a case where the maximum luminance value in a column has a luminance value not less than a first threshold, that column is taken as a pixel column to be processed,
the sum of the number of pixels giving the maximum luminance value and the number of pixels having a luminance value not less than a second threshold with respect to the maximum luminance value in each of the pixel columns to be processed is taken as the thickness of the light-section line in each of the pixel columns to be processed, and the average of the thicknesses of the light-section line in all the pixel columns to be processed is calculated and taken as the thickness indicator value, and
a value obtained by dividing the average of luminance values in all pixels that have been used at a time of calculating the thickness indicator value by a maximum output luminance value possibly outputted from the imaging apparatus is taken as the brightness indicator value.

2. The shape inspection method according to claim 1, wherein, in the indicator value calculation step, the thickness indicator value and the brightness indicator value are calculated using the light-section image obtained by imaging of only one light-section line on the object at rest.

3. The shape inspection method according to claim 1, wherein, in the setting changing step, setting of at least one of the laser light source and the imaging apparatus is changed so that the thickness indicator value is within a range of 1.27 to 2.52 (pixel) and the brightness indicator value is within a range of 0.24 to 0.52.

4. The shape inspection method according to claim 1, wherein, in the setting changing step,
at least one of a focus of a lens included in the imaging apparatus, a focus of a lens included in the laser light source, and a separation distance between the laser light source and the object surface is adjusted in order to bring the thickness indicator value within the prescribed range, and
at least one of an exposure time of the imaging apparatus, an aperture of a lens included in the imaging apparatus, a gain of the imaging apparatus, and a power of the laser light source is adjusted in order to bring the brightness indicator value within the prescribed range.

5. A shape inspection apparatus comprising:
a light-section image generation apparatus including
a laser light source that applies linear laser light to an object surface, and
an imaging apparatus that images a light-section line based on the laser light on the object surface and generates a light-section image that is a captured image used for a light-section method; and
an arithmetic processing apparatus that performs image processing on the light-section image generated by the light-section image generation apparatus, assesses a state of the light-section line, and performs a shape inspection of the object surface based on a light-section method on the basis of the light-section image,
wherein the arithmetic processing apparatus includes
an indicator value calculation unit that, on the basis of the light-section image generated by the imaging apparatus, calculates a thickness indicator value indicating a thickness of the light-section line and a brightness indicator value indicating a brightness of the light-section line in the light-section image,
an assessment unit that, on the basis of the calculated thickness indicator value and the calculated brightness indicator value, assesses whether each of the thickness indicator value and the brightness indicator value is within a prescribed range or not, and
a shape inspection unit that performs shape inspection processing based on a light-section method on the basis of the light-section image after each of the thickness indicator value and the brightness indicator value is brought within a prescribed range uniquely set in advance,
wherein the indicator value calculation unit
specifies a pixel giving a maximum luminance value in each of column directions of a light-section image related to the object surface that are directions corresponding to a relative movement direction of the object and the laser light source, and in a case where the maximum luminance value in a column has a luminance value not less than a first threshold, takes that column as a pixel column to be processed,
takes the sum of the number of pixels giving the maximum luminance value and the number of pixels having a luminance value not less than a second threshold with respect to the maximum luminance value in each of the pixel columns to be processed as the thickness of the light-section line in each of the pixel columns to be processed, and calculates the average of the thicknesses of the light-section line in all the pixel columns to be processed and takes the average as the thickness indicator value, and
takes a value obtained by dividing the average of luminance values in all pixels that have been used at a time of calculating the thickness indicator value by a maximum output luminance value possibly outputted from the imaging apparatus as the brightness indicator value.

6. The shape inspection apparatus according to claim 5, wherein the indicator value calculation unit calculates the thickness indicator value and the brightness indicator value using the light-section image obtained by imaging of only one light-section line on the object at rest.

7. The shape inspection apparatus according to claim 5, wherein the shape inspection apparatus further comprises an adjustment mechanism that adjusts setting of at least one of the laser light source and the imaging apparatus included in the light-section image generation apparatus,
the arithmetic processing apparatus further includes
an imaging control unit that controls driving of the light-section image generation apparatus, and
an adjustment control unit that controls driving of the adjustment mechanism, and
the adjustment control unit, on the basis of assessment result by the assessment unit, puts at least one of the adjustment mechanism and the imaging control unit into operation so that the thickness indicator value and the brightness indicator value are within the prescribed range.

8. The shape inspection apparatus according to claim 5, wherein setting of at least one of the laser light source and the imaging apparatus is changed so that the thickness indicator value is within a range of 1.27 to 2.52 (pixel) and the brightness indicator value is within a range of 0.24 to 0.52.

9. The shape inspection apparatus according to claim 5, wherein at least one of a focus of a lens included in the imaging apparatus, a focus of a lens included in the laser light source, and a separation distance between the laser light source and the object surface is adjusted in order to bring the thickness indicator value within the prescribed range, and
at least one of an exposure time of the imaging apparatus, an aperture of a lens included in the imaging apparatus, a gain of the imaging apparatus, and a power of the laser light source is adjusted in order to bring the brightness indicator value within the prescribed range.

* * * * *